US011453410B2

(12) United States Patent
Kundu

(10) Patent No.: US 11,453,410 B2
(45) Date of Patent: Sep. 27, 2022

(54) REDUCING PROCESSING REQUIREMENTS FOR VEHICLE CONTROL

(71) Applicant: Hitachi, Ltd., Tokyo (JP)

(72) Inventor: Subrata Kumar Kundu, Canton, MI (US)

(73) Assignee: HITACHI, LTD., Tokyo (JP)

(*) Notice: Subject to any disclaimer, the term of this patent is extended or adjusted under 35 U.S.C. 154(b) by 193 days.

(21) Appl. No.: 16/686,273

(22) Filed: Nov. 18, 2019

(65) Prior Publication Data

US 2021/0146944 A1 May 20, 2021

(51) Int. Cl.
*B60W 50/08* (2020.01)
*G01C 21/34* (2006.01)
*B60W 50/00* (2006.01)
*B60W 40/06* (2012.01)

(52) U.S. Cl.
CPC .......... *B60W 50/085* (2013.01); *B60W 40/06* (2013.01); *B60W 50/0097* (2013.01); *G01C 21/3484* (2013.01)

(58) Field of Classification Search
CPC combination set(s) only.
See application file for complete search history.

(56) References Cited

U.S. PATENT DOCUMENTS

| 8,630,768 | B2 | 1/2014 | McClellan et al. |
|---|---|---|---|
| 2014/0139341 | A1 | 5/2014 | Green et al. |
| 2017/0259753 | A1* | 9/2017 | Meyhofer ............ H04N 13/204 |
| 2018/0005525 | A1* | 1/2018 | Parundekar .......... G08G 1/0967 |
| 2018/0061148 | A1* | 3/2018 | Dudar .................... G08G 1/165 |
| 2018/0204570 | A1 | 7/2018 | Puranik |
| 2020/0033859 | A1* | 1/2020 | Xiao ..................... G01S 7/4817 |
| 2021/0061277 | A1* | 3/2021 | Zhang ................... B60W 10/18 |
| 2022/0103789 | A1* | 3/2022 | Jung ....................... H04N 5/268 |

* cited by examiner

*Primary Examiner* — Jeff A Burke
*Assistant Examiner* — Zachary Joseph Wallace
(74) *Attorney, Agent, or Firm* — Mattingly & Malur, PC

(57) ABSTRACT

In some examples, one or more processors of a vehicle may receive location field-of-view (FOV) data for an upcoming location on a route traversed by the vehicle. For instance, the one or more processors may select, based on the location FOV data, one or more sensors to activate on the vehicle for performing sensing in a direction of a field of view indicated by the location FOV data. In addition, the one or more processors may cause the vehicle to traverse the upcoming location with the one or more sensors activated on the vehicle for performing sensing in the direction of the FOV indicated by the location FOV data.

21 Claims, 16 Drawing Sheets

| SENSOR ID 302 | SENSOR STATUS 304 | SENSOR TYPE 306 | SENSOR LOCATION 308 | SENSOR RANGE (M) 310 | SENSOR FOV (DEG) 312 |
|---|---|---|---|---|---|
| 1 | ACTIVE | MONO CAMERA/ULTRASONIC SENSOR | FRONT | 10 | 180 |
| 2 | ACTIVE | MONO CAMERA/ULTRASONIC SENSOR | LEFT | 10 | 180 |
| 3 | ACTIVE | MONO CAMERA/ULTRASONIC SENSOR | REAR | 10 | 180 |
| 4 | ACTIVE | MONO CAMERA/ULTRASONIC SENSOR | RIGHT | 10 | 180 |
| 5 | ACTIVE | MID-RANGE RADAR | LEFT-FRONT | 100 | 150 |
| 6 | ACTIVE | MID-RANGE RADAR | LEFT-REAR | 100 | 150 |
| 7 | ACTIVE | MID-RANGE RADAR | RIGHT-REAR | 100 | 150 |
| 8 | ACTIVE | MID-RANGE RADAR | RIGHT-FRONT | 100 | 150 |
| 9 | ACTIVE | WIDE STEREO/MONO CAMERA | FRONT | 70 | 130 |
| 10 | ACTIVE | STEREO CAMERA | FRONT | 200 | 80 |
| 11 | ACTIVE | LONG RANGE RADAR | FRONT | 350 | 50 |

FIG. 3

| Sensor ID | Sensor Status | Sensor Type | Sensor Location | Sensor Range (M) | Sensor FOV (DEG) |
|---|---|---|---|---|---|
| 1 | Active | Mono Camera/Ultrasonic Sensor | Front | 10 | 180 |
| 2 | Mod FOV | Mono Camera/Ultrasonic Sensor | Left | 10 | 125 |
| 3 | Inactive | Mono Camera/Ultrasonic Sensor | Rear | | |
| 4 | Mod FOV | Mono Camera/Ultrasonic Sensor | Right | 10 | 125 |
| 5 | Active | Mid-Range Radar | Left-Front | 100 | 150 |
| 6 | Inactive | Mid-Range Radar | Left-Rear | | |
| 7 | Inactive | Mid-Range Radar | Right-Rear | | |
| 8 | Active | Mid-Range Radar | Right-Front | 100 | 150 |
| 9 | Active | Wide Stereo/Mono Camera | Front | 70 | 130 |
| 10 | Mod Range | Stereo Camera | Front | 100 | 80 |
| 11 | Inactive | Long Range Radar | Front | | |

FIG. 6

REDUCING PROCESSING REQUIREMENTS FOR VEHICLE CONTROL

BACKGROUND

Autonomous driving (AD) systems and advanced driver assistance systems (ADAS) are systems that automate vehicle control, such as for enabling automated driving, semi-automated driving, or for otherwise enhancing vehicle systems for improved safety, convenience, fuel economy, and the like. For instance, vehicles may be equipped with multiple sensors to continuously monitor the vehicle and the vehicle surroundings. Examples of such sensors may include mono cameras, stereo cameras, infrared cameras, radar, LIDAR, Global Positioning System (GPS) receivers, ultrasonic sensors, and so forth. These sensors may be used in ADAS/AD systems to capture and integrate various different types of information.

The information captured by the sensors from the environment surrounding the vehicle may be used as input information to a controller that is configured to control the vehicle intelligently, such as for preventing collisions, reducing fuel consumption, and increasing the convenience and safety of the passengers. However, the multiple sensors employed on the vehicle may generate a huge amount of data, much of which may need to be processed in real time or near-real time. Consequently, it can be challenging to process all the sensor data properly and on time using the on-board processors that may be present on the vehicle.

SUMMARY

Some implementations include arrangements and techniques for improvements in autonomous and semiautonomous vehicle navigation technology. In some examples, one or more processors of a vehicle may receive location field-of-view (FOV) data for an upcoming location on a route (path) traversed by the vehicle. For instance, the one or more processors may select, based on the location FOV data, one or more sensors to activate on the vehicle for performing sensing in a direction of a field of view indicated by the location FOV data. In addition, the one or more processors may cause the vehicle to traverse the upcoming location with the one or more sensors activated on the vehicle for performing sensing in the direction of the FOV indicated by the location FOV data.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 3 illustrates an example sensor management data structure according to some implementations.

FIG. 6 illustrates an example of the sensor management data structure corresponding to the left turn discussed with respect to FIG. 5 according to some implementations.

DESCRIPTION OF THE EMBODIMENTS

Figure 1:
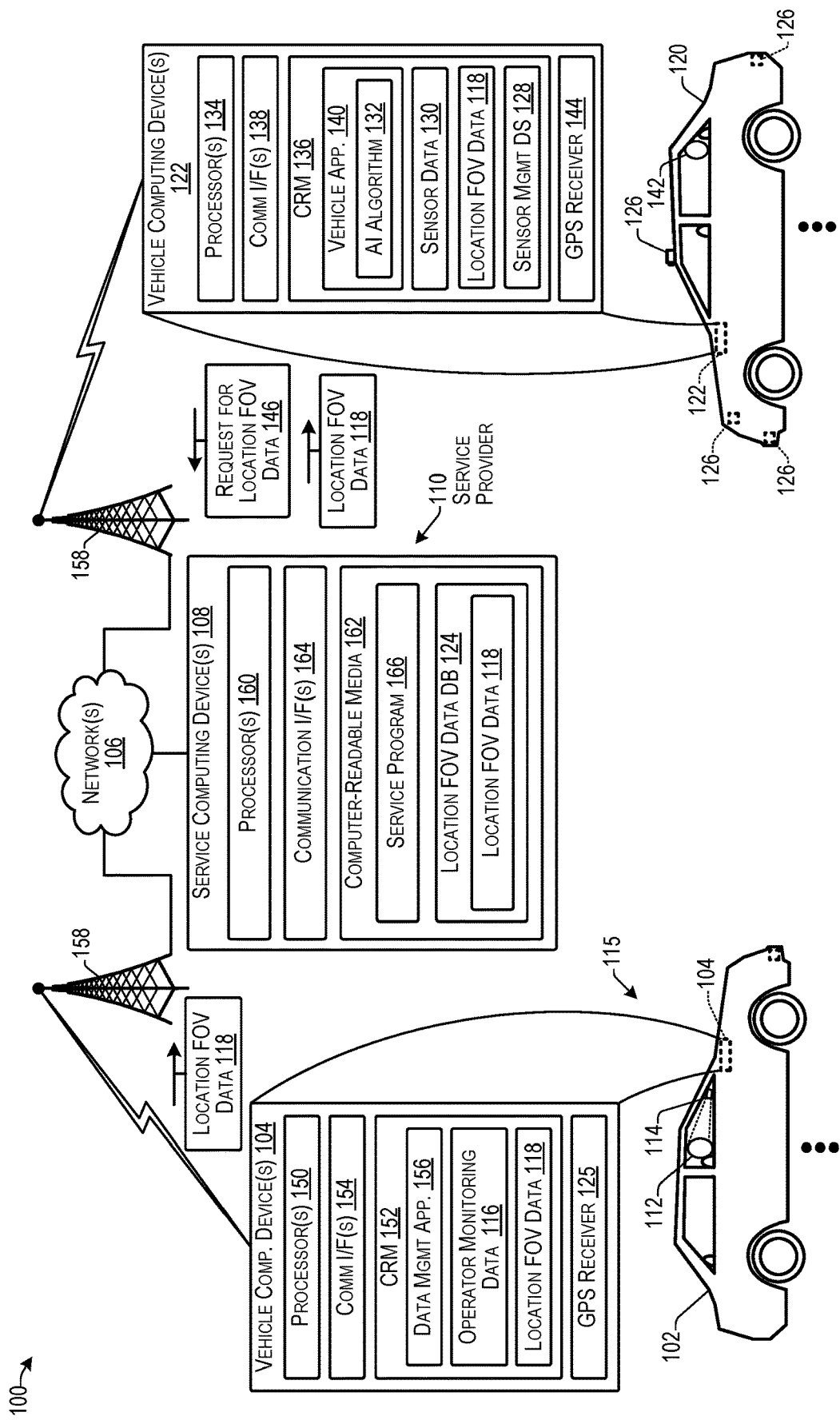
FIG. 1 illustrates an example architecture of a system able to reduce processing requirements for vehicle control according to some implementations.

Some implementations herein are directed to techniques and arrangements for optimizing utilization of sensors on an ADAS/AD vehicle, as well as optimizing the execution of associated algorithms for reducing the amount of data to be processed based at least partially on using previously determined location-based field-of-view (FOV) data. In some cases, the implementations herein include one or more data structures, such as one or more databases of location FOV data collected through automated monitoring of a plurality of vehicle operators (human drivers) in a large number of vehicles at a large number of locations.

In some cases, a location FOV data database or other data structure may be accessed locally on an ADAS/AD vehicle or remotely over a network by the ADAS/AD vehicle to obtain the correct location FOV data for use at particular locations. For example, the ADAS/AD vehicle computing device may access the location FOV data in advance of approaching an upcoming location, such as for determining which sensors on the ADAS/AD vehicle to activate, deactivate, modify the detection range of, modify the sampling rate of, or the like. As one example, an ADAS/AD vehicle may determine a route (path) that will be traveled by the ADAS/AD vehicle, and may download the corresponding location FOV data, may determine that the location FOV data has already been stored locally, or may otherwise ensure in advance that all of the location FOV data for the route that will be traveled will be available to be accessed while the vehicle is traversing the route.

Some examples herein may utilize human vehicle operator information extracted using a vehicle operator monitoring system to reduce the number of active sensors when performing ADAS/AD vehicle navigation. For instance, the ADAS/AD vehicle may use the location FOV data determined from monitoring human drivers to optimize the FOV of the onboard sensors and may employ an autonomous driving algorithm to realize autonomous driving using a lower cost processor, such as may be available typically in an onboard electronic control unit (ECU). In some examples, an FOV plot or map may be created which may be used to optimize the sensing parameters for ADAS/AD vehicles. The FOV map may indicate the typical field of view of a driver for any road, intersection or other location being transverse by the ADAS/AD vehicle.

The FOV map information may be created by crowd sourcing, or the like, using a number of driver monitoring systems in human-operated vehicles. As one example, a camera-based driver monitoring system may be installed in a large number of human-operated vehicles and used to detect the vehicle operator's eye gaze and head position, as well as drowsiness, distraction, emotion, and fatigue level. Different operators' gazes may be tracked and recorded for each location such as for determining the operators' FOV for all roads and intersections that will be traveled by ADAS/AD vehicles. For example, after an operator has elected to have a monitoring system installed in the operator's vehicle, the operator's eye position, head position, and other operator conditions may be monitored using the camera-based driver monitoring system and/or other sensors. The collected operator's FOV information may be stored in association with the operator's current location. The tracked gaze (e.g., where the operator's eyes appear to be focused), operator head position, and so forth, may be used to determine the operator's FOV. While the operator is driving, the collected FOV information may be correlated with location data, such as by using GPS data with a coordinate transformation system to create the location FOV data database. The location FOV data may be created for all roads and intersections in which ADAS/AD vehicles will operate.

Additionally, the sequence of operator's eye gaze direction may also be recorded and included in the location FOV data. As one example, suppose the vehicle operator is navigating an intersection. The vehicle operator may initially check that the vehicle is in the correct lane, and may also check any traffic light or traffic signs, may look from the traffic light into the direction of the turn, and may then proceed to make the turn at the intersection. This sequence of actions and consecutive FOV changes may be recorded and included in the FOV map data.

After the location FOV data database has been created, the location FOV data may be stored in a cloud server or other network location, or may be downloaded and stored in a local storage on the ADAS/AD vehicle. ADAS/AD vehicles which are equipped with multiple sensors may employ the location FOV data database to select the appropriate sensors to use at any point in navigation to minimize the number of sensors being used and to thereby reduce the processing requirements for processing the sensor data and for speeding up the processing of the sensor data for the sensors that are being used. The required number of sensors and sensors' FOV may be determined by the vehicle controller based on the location FOV data.

As one example, an ECU or other controller of an ADAS/AD vehicle may access the location FOV data for an upcoming location to determine which sensors' data to read and process. Further, in some cases, the range of a sensor and/or the sampling rate of a sensor may be reduced based on the location FOV data and the vehicle location information. In addition, the controller may also determine which part of a deep neural network or other artificial intelligence algorithm to execute based on the vehicle location and location FOV data indicating the areas of interest for the vehicle surroundings. Accordingly, implementations herein may significantly reduce the memory and processing requirements for the controller, which may improve the efficiency of operation, safety, and cost-effectiveness for autonomous vehicle operation.

Some examples herein may provide significant benefits for current and future ADAS/AD vehicles. For example, sensors and ECUs may be configured to be compatible with the proposed FOV database. Further, implementations herein may enable the use of lower-cost ECUs or other processors in the vehicle and/or may enable the use of sensor configurations for a higher level of automation. For example, currently available semi-autonomous vehicles are equipped with multiple sensors and high specification processors to enable system redundancy for ensuring higher safety and performance, which increases costs of these systems, while limiting usage to premium vehicles. On the other hand, implementations herein minimize sensor usage to allow lower cost processors to be used for achieving a higher level of automation.

For discussion purposes, some example implementations are described in the environment of determining which sensor data to process in real time for autonomous and semi-autonomous vehicles. However, implementations herein are not limited to the particular examples provided, and may be extended to other types of sensing devices, other types of vehicles, other types of data, other uses for the collected data, and so forth, as will be apparent to those of skill in the art in light of the disclosure herein.

FIG. 1 illustrates an example architecture of a system 100 able to reduce processing requirements for vehicle control according to some implementations. The system 100 includes one or more human-operated vehicles 102 that may each include a vehicle computing device 104 able to communicate over one or more networks 106 with one or more service computing devices 108 of a service provider 110. Each human-operated vehicle 102 may include a vehicle operator 112 who may be monitored by one or more operator monitoring sensors 114 included in the human-operated vehicle 102 to provide operator monitoring data 116 to the vehicle computing device 104.

As one example, the operator monitoring sensor(s) 114 may include one or more cameras or other types of sensors, which serve as part of an operator monitoring system 115 that monitors the eye position, head position, alertness, distraction, emotion, fatigue, or other conditions of the vehicle operator 112. The vehicle operator information extracted using the operator monitoring system 115 may be stored by the vehicle computing device 104 as the operator monitoring data 116. The operator monitoring data 116 collected from the operator monitoring system 115 may be used to generate location field-of-view (FOV) data 118, either at the vehicle computing device 104, or at the service computing device 108.

As discussed additionally below, the system 100 may utilize location FOV data 118 in one or more ADAS/AD vehicles 120 for reducing the number of sensors employed at any one time. The location FOV data 118 may also be used to optimize the autonomous driving algorithm(s) used by the ADAS/AD vehicles 120 to realize autonomous driving using a lower-cost ECU or other vehicle computing device 122 on the ADAS/AD vehicles 120.

For example, the location FOV data 118 may be used to optimize the sensing configuration for ADAS/AD vehicles 120. The location FOV data 118 may indicate the usual field of view of a driver for a particular road, intersection or the like. The location FOV data 118 may be created using the driver monitoring systems 115 in a large number of the human-operated vehicles 102. For example, various different drivers' eye position, head position, alertness, etc. maybe tracked to determine the drivers' field of view for all roads and intersections that are expected to be navigated by the ADAS/AD vehicles 120. The tracked eye positions, head positions, etc. may correlated with corresponding GPS coordinates to create the drivers' location FOV data 118.

The location FOV data 118 may be generated for all the roads and intersections that will be traversed by the ADAS/AD vehicles 120. Additionally, location FOV data 118 may include a determined sequence of the operator's eye and head positions, which may be correlated with sequential activation of corresponding sensors on the ADAS/AD vehicles 120 as the ADAS/AD vehicles 120 are navigating the particular road intersection or the like. For example, when navigating an intersection, a driver may initially check the correct lane, followed by checking the traffic light and/or traffic signs, checking the path ahead of the vehicle for oncoming traffic, and checking the path toward the road onto which the vehicle is turning, as well as checking any crosswalks or other obstacles in that direction, and the performing the turn. This sequence of actions and consecutive FOVs of the vehicle operator may be stored and included in the location FOV data 118.

The location FOV data 118 from a plurality of the human-operated vehicles 102 may be sent to the service computing device(s) 108 and stored in a data structure, such as an FOV map information database (DB) 124. After the FOV map information database 124 has been created, the FOV map information database 124 may be accessible to the ADAS/AD vehicle(s) 120 such as in a cloud storage location, or other network location, or at least portions of the FOV map information database 124 may be stored locally on each ADAS/AD vehicle 120.

Each ADAS/AD vehicle 120 may be a semi-autonomous or autonomous (ADAS/AD) vehicle that is equipped with multiple sensors 126 that communicate sensor information to the ECU or other onboard vehicle computing device(s) 122. Examples of such sensors 126 may include mono cameras, stereo cameras, infrared cameras, radar, LIDAR, Global Positioning System (GPS) receivers, ultrasonic sensors, and so forth. For instance, multiple sensors 126 may be generally connected with the vehicle computing device(s) 122 to process the sensor data, recognize obstacles, determine vehicle control signals, and so forth, which may be sent to various actuators (not shown in FIG. 1). To process the huge amount of data generated by the sensors 126, the vehicle computing device(s) 122 typically requires high processing and memory capabilities, which can significantly increase costs and complexity. For example, a GPU (graphics processing unit) might be included in the vehicle computing device(s) 122 to process graphical data from multiple sensors such as cameras, radar or LIDAR; however, GPUs tend to generate large amounts of heat and may require inclusion of a cooling unit, which in turn may ultimately reduce the fuel efficiency of the vehicle while also added to vehicle weight and size.

In some conventional systems, all the sensors used for AD and/or ADAS vehicles may operate continuously at their default sampling rate and/or range to provide sensor data. However, the inventor herein has determined that in many situations there is no need to operate all of the sensors at their maximum sensing rates and/or ranges, or even operated at all. To the contrary, the inventor herein has determined that there are only a few situations when all the sensors need to be operated concurrently. For instance, human drivers may adjust their head posture and gaze direction depending on the situations during driving, as it is generally not necessary for a driver to monitor 360 degrees around the vehicle continuously. On the other hand, to ensure safety and system redundancy ADAS/AD vehicles 120 are equipped with multiple sensors 126. The sensors 126 may be managed using a sensor management data structure (DS) 128 discussed additionally below, e.g., with respect to FIGS. 3 and 6. Accordingly, implementations herein provide techniques for optimizing the number of sensors 126 being used at any point in time, as well as the ranges and sampling rates of those sensors 126, so that conventional lower-cost ECUs or other lower-processing-capacity processors may be used to process sensor data 130 received from the sensors 126. Example sensor configurations for the ADAS/AD vehicle 120 are discussed additionally below, e.g., with respect to FIGS. 2 and 3.

In some cases, each ADAS/AD vehicle 120 may include a multi-sensor fusion that may utilize the location FOV data 118 obtained from the FOV map information database 124 and information in the sensor management data structure 128 to select the appropriate sensors 126 from which to receive the sensor data 130 at any point in time, based on the indicated FOV in the location FOV data 118, for minimizing the number of sensors 126 employed and the amount of sensor data 130 to processed. Accordingly, the sensors' field of view and the required number of sensors 126 to use may be decided based on the location FOV data 118. The vehicle computing device 122 of the ADAS/AD vehicle 120 may determine, based on the location FOV data 118, which sensor data 130 of which sensors 126 to read, what the range of the sensors 126 should be (if adjustable), what the sampling rate of the sensors should be (if controllable), and so forth, based on the location FOV data 118 and the current vehicle location information. In addition, the vehicle computing device 122 may also determine which part of a deep neural network, machine learning model, or other artificial intelligence (AI) algorithm 132 to execute taking into consideration the vehicle location and the corresponding location FOV data 118.

The vehicle computing device 122 may include at least one processor 134 and one or more computer-readable media (CRM) 136. In addition, the vehicle computing device 122 may include one or more communication interfaces (I/Fs) 138. The processor 134 may be implemented as one or more microprocessors, microcomputers, microcontrollers, digital signal processors, central processing units, state machines, logic circuitries, and/or any devices that manipulate signals based on operational instructions. In some cases, the processor 134 may be one or more hardware processors and/or logic circuits of any suitable type specifically programmed or configured to execute the algorithms and processes described herein. The processor 134 may be configured to fetch and execute computer-readable, processor-executable instructions stored in the computer-readable media 136.

In some examples, the processor(s) 134 may be one or more processors included in one or electronic control units (ECUs) in the ADAS/AD vehicle(s) 120. For example, "ECU" is a generic term for any embedded system that controls one or more of the systems, subsystems, or components in a vehicle. Each ECU may include one or more processors, a memory or other CRM 136, and digital and/or analog communication interfaces 138. Software for execution by a particular ECU, may be stored in a portion of the memory (e.g., program ROM) associated with the respective ECU to enable the ECU to operate as an embedded system. ECUs may typically communicate with each other over a vehicle bus (not shown in FIG. 1) according to a vehicle bus protocol. As an example, the Controller Area Network bus (CAN bus) protocol is a vehicle bus protocol that allows ECUs and other devices onboard a vehicle to communicate with each other without a host computer. A CAN bus may include at least two different types. For example, high-speed CAN may be used in applications where the bus runs from one end of the environment to the other, while fault-tolerant CAN is often used where groups of nodes are connected together. Alternatively, in some examples, the processor(s) 134 may include other types of processors, controllers, computing devices, etc., as detailed above.

The one or more computer-readable media 136 may be an example of tangible non-transitory computer storage media and may include volatile and nonvolatile memory and/or removable and non-removable media implemented in any type of technology for storage of information such as computer-readable processor-executable instructions, data structures, program modules, or other data. The computer-readable media 136 may include, but is not limited to, RAM, ROM, EEPROM, flash memory, solid-state storage, magnetic disk storage, optical storage, and/or other computer-readable media technology. Accordingly, the computer-readable media 136 may be computer storage media able to store instructions, modules, applications, and the like, that may be executed by the processor 134. Further, when mentioned, non-transitory computer-readable media exclude media such as energy, carrier signals, electromagnetic waves, and signals per se.

The computer-readable media 136 may be used to store and maintain functional components that are executable by the processor 134. In some implementations, these functional components comprise instructions or programs that are executable by the processor 134 and that, when executed, implement operational logic for performing the actions and services attributed above to the vehicle computing device 122. Functional components of the vehicle computing device 122 stored in the computer-readable media 136 may include a vehicle application 140 which may include a series of instructions and/or executable code for causing the processor 134 to perform the functions described herein. For example, the vehicle application 140 may receive the sensor data 130 from the sensors 126, may store the sensor data 130 in the computer-readable media, such as in a buffer or in a more permanent storage location, and may process the sensor data 130 for determining vehicle control signals. In some cases, the vehicle application 140 may include, or may access, the AI algorithm 132, which may receive the sensor data 130 and which may determine one or more of the control signals for the ADAS/AD vehicle 120 based at least in part on the sensor data 130.

In some examples, the vehicle application 140 may control some or all aspects of the vehicle navigation, interaction with passengers 142 in the vehicle 120, and communication with the service computing device(s) 108. The vehicle application 140 may receive the sensor data 130 from the sensors 126, and may perform recognition, perception and/or identification based on the received sensor data 130. For example, the vehicle application 140 may include recognition capability for recognizing different objects in front of or in the back of the vehicle, as well as recognizing lane markers, pedestrians, cyclists, traffic signs, traffic lights, and so forth around the vehicle. The vehicle application 140 may also use map data for determining the vehicle location and for assessing the surroundings. The vehicle application 140 may further apply a vehicle control algorithm to determine free space or a desired trajectory, and may generate the necessary control signals for various actuators, such as for steering, braking, acceleration, etc. In some cases, such as for automated valet parking, a vehicle may also communicate with a local infrastructure, such as via dedicated short-range communications (DSRC), BLUETOOTH®, cellular, Wi-Fi, etc.

In some examples, the vehicle application 140 may interact with the passenger(s) 142 and/or the service computing device(s) 108 to determine a destination and a route to the destination. The vehicle application 140 may determine whether the location FOV data 118 stored onboard the vehicle 120 includes all the roads and intersections along the selected route and any likely alternate routes to the destination. If the location FOV data 118 corresponding to the selected route is not currently stored locally in the CRM 136 on the vehicle 120, the vehicle application 140 may send a request 146 for FOV map information to the service computing device(s) 108. The vehicle application 140 may receive the requested location FOV data 118, and may use the location FOV data 118 for controlling the sensors 126 and/or for selecting which sensor signals of which sensors 126 to process while traversing the selected route toward the specified destination. If the destination should change while the vehicle 120 is traveling along the selected route, the vehicle application 140 may download any additional location FOV data 118 that may be needed for the new route to the new destination.

In addition, the computer-readable media 136 may also store data, data structures, and the like, that are used by the functional component(s). Data stored by the computer readable media 136 may include the sensor data 130, which may be stored temporarily in a buffer or in a more permanent storage location in the computer readable media 136. In addition, the computer readable media 136 may store the location FOV data 118 in a database, table, or any other suitable type of data structure (not shown in FIG. 1). Further, the vehicle computing device 122 may include other logical, programmatic, and/or physical components, of which those described are merely examples that are related to the discussion herein.

The communication interface(s) 138 may include one or more interfaces and hardware components for enabling communication with various other devices, such as over the network(s) 106. For example, communication interface(s) 138 may enable communication through one or more of cellular networks, wireless networks (e.g., Wi-Fi) as well as short-range communications such as BLUETOOTH®, and the like, as additionally enumerated elsewhere herein. Alternatively, in some examples, the communication interface(s) 138 may include the ability to communicate through a wired network (e.g., fiber optic, Ethernet), such as in the case that the communication interfaces are connected to a wired connection that is used to download location FOV data 118 directly to the vehicle computing device 122.

The vehicle computing device(s) 104 on the human-operated vehicle(s) 102 may have a hardware configuration that is similar to that described above with respect to the vehicle computing device 122, but with different functional components. Further, vehicle computing device(s) 104 may not require as much processing capacity or memory capacity as the vehicle computing device 122, so a less powerful processor and/or smaller memory or other CRM might be employed.

Accordingly, the vehicle computing device 104 on the human-operated vehicle(s) 102 may include one or more processors 150, which may correspond to any of the processors 134 discussed above (e.g., an ECU) or other suitable processors. The computer-readable media 152 may include any of the types of computer-readable media 126 discussed above. Further, the communication interface(s) 154 may include any of the types of communication interfaces 138 discussed above.

The computer-readable media 152 may be used to store and maintain functional components that are executable by the processor(s) 150. In some implementations, these functional components comprise instructions or programs that are executable by the processor(s) 150 and that, when executed, implement operational logic for performing the actions and services attributed above to the vehicle computing device 104. Functional components of the vehicle computing device 104 stored in the computer-readable media 152 may include a data management application 156, which may include a series of instructions and/or executable code for causing the processor 150 to receive the operator monitoring data 116, determine the location FOV data 118 for the received operator monitoring data based on location information determined from a GPS receiver 125 included on the human-operated vehicle 102, and send the location FOV data 118 to the service computing device(s) 108. Alternatively, in other examples, the data management application 156 may send the operator monitoring data 116 and GPS location information to the service computing device(s) 108, and the service computing device(s) 108 may determine the location FOV data 118, such as based on matching timestamps associated with the operator monitoring data 116 with timestamps associated with the location information determined from the GPS receiver 125.

In addition, the computer-readable media 152 may also store data, data structures, and the like, that are used by the functional component(s). Data stored by the computer readable media 152 may include the operator monitoring data 130, which may be stored temporarily in a buffer or in a more permanent storage location in the computer readable media 136. In addition, the computer readable media 136 may store the location FOV data 118 in a database, table, or any other suitable type of data structure. Further, the vehicle computing device 104 may include other logical, programmatic, and/or physical components, of which those described are merely examples that are related to the discussion herein.

The one or more networks 106 may include any appropriate network or combination thereof, including a wide area network, such as the Internet; a local area network, such an intranet; a wireless network, such as a cellular network, a local wireless network, such as Wi-Fi and/or short-range wireless communications, such as BLUETOOTH®; a wired network, including fiber optics and Ethernet; or any other such network, or any combination thereof. Accordingly, the one or more networks 106 may include both wired and/or wireless communication technologies. Components used for such communications can depend at least in part upon the type of network, the environment selected, or both. Protocols for communicating over such networks are well known and will not be discussed herein in detail. Accordingly, vehicle computing device 104 and the service computing device(s) 108 are able to communicate over the one or more networks 106 using wired or wireless connections, and combinations thereof.

In some examples, the vehicle computing devices 104 and 122 may communicate over the network(s) 106 through a cellular communication interface as one of the communication interfaces 154 and 138 included in the vehicles 102 and 120, respectively, or through other type of wireless transmissions. For instance, many vehicles include a cellular transceiver as standard equipment that may be used to transmit the location FOV data 118 from the vehicle computing device 104 to the service computing device(s) 108, such as via a cell tower 158. Similarly, the vehicle computing device 122 may use the cellular transceiver to receive the location FOV data 118 via one or more cell towers 158. Alternatively, the vehicle computing device(s) 104 and/or 122 may include a dedicated cellular transmitter as at least one of the communication interfaces 138. In some examples, the vehicle computing device(s) 104 and/or the vehicle computing devices 122 may communicate with the service computing device(s) 108 via one or more application programming interfaces (APIs).

In some cases, the service computing device(s) 108 may include one or more servers, personal computers, or other types of computing devices that may be embodied in any number of ways. For instance, in the case of a server, the programs, other functional components, and at least a portion of data storage may be implemented on at least one server, such as in a cluster of servers, a server farm, a data center, a cloud-hosted computing service, and so forth, although other computer architectures may additionally or alternatively be used. Thus, the service computing device(s) 108 may be associated with the service provider 110, which may provide a service for managing the FOV map information database 124, and for providing location FOV data 118 to the ADAS/AD vehicles 120. The service computing device(s) 108 may provide other services as well, such as providing transportation to customers, such as passenger 142, or any of various other types of services. The functions performed by the service computing device(s) 108 may be distributed among multiple service computing devices 108 in any desired manner, or may be performed by a single service computing device 108.

Further, while the figures illustrate the functional components and data of the s service computing device(s) 108 as being present in a single location, these components and data may alternatively be distributed across different computing devices and different locations in any manner. Consequently, the functions may be implemented by one or more service computing devices, with the various functionality described above distributed in various ways across the different computing devices. Multiple service computing devices 108 may be located together or separately, and organized, for example, as virtual servers, server banks, and/or server farms. The described functionality may be provided by the servers of a single entity or enterprise, or may be provided by the servers and/or services of multiple different entities or enterprises.

In the illustrated example, each service computing device 108 may include one or more processors 160, one or more computer-readable media 162, and one or more communication interfaces 164. Each processor 160 may be a single processing unit or a number of processing units, and may include single or multiple computing units or multiple processing cores. The processor(s) 160 can be implemented as one or more microprocessors, microcomputers, microcontrollers, digital signal processors, central processing units, state machines, logic circuitries, and/or any devices that manipulate signals based on operational instructions. For instance, the processor(s) 160 may be one or more hardware processors and/or logic circuits of any suitable type specifically programmed or configured to execute the algorithms and processes described herein. The processor(s) 160 can be configured to fetch and execute computer-readable instructions stored in the computer-readable media 162, which can configure the processor(s) 160 to perform the functions described herein.

The computer-readable media 162 may include volatile and nonvolatile memory and/or removable and non-removable media implemented in any type of technology for storage of information, such as computer-readable instructions, data structures, program modules, or other data. Such computer-readable media 162 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device(s) 108, the computer-readable media 162 may be a type of computer-readable storage media and/or may be a tangible non-transitory media to the extent that when mentioned herein, non-transitory computer-readable media exclude media such as energy, carrier signals, electromagnetic waves, and signals per se.

The computer-readable media 162 may be used to store any number of functional components that are executable by the processors 160. In many implementations, these functional components comprise instructions or programs that are executable by the processors 160 and that, when executed, specifically configure the one or more processors 160 to perform the actions attributed above to the service computing device(s) 108. Functional components stored in the computer-readable media 162 may include the service program 166 that may receive, store, and/or send the location FOV data 118. Additionally, in some cases, the service program 166 may determine the FOV map data based on received operator monitoring data 116 and corresponding location information, such as may have been determined by the GPS receiver at the same time that the operator monitoring data 116 was collected.

In addition, the computer-readable media 162 may store data used for performing the operations described herein. Thus, the computer-readable media 162 may store the location FOV data 118 in the FOV map information database 124 or any other suitable data structure. The service computing device(s) 108 may also include or maintain other functional components and data not specifically shown in FIG. 1, such as other programs and data, which may include programs, drivers, etc., and the data used or generated by the functional components. Further, the service computing device(s) 108 may include many other logical, programmatic, and physical components, of which those described above are merely examples that are related to the discussion herein.

The communication interface(s) 164 may include one or more interfaces and hardware components for enabling communication with various other devices, such as over the network(s) 106. For example, communication interface(s) 164 may enable communication through one or more of the Internet, cable networks, cellular networks, wireless networks (e.g., Wi-Fi) and wired networks (e.g., fiber optic and Ethernet), as well as close-range communications, such as BLUETOOTH®, BLUETOOTH® low energy, and the like, as additionally enumerated elsewhere herein.

The system 100 may significantly reduce the memory and processing requirements of the vehicle computing device(s) 122, which may ultimately help to realize cost effective autonomous vehicles. Additionally, while an example of an operator monitoring sensor 114 is described above, implementations herein are not limited to any particular type of operator monitoring sensor(s) 114. Furthermore, while a single human-operated vehicle 102 and single vehicle operator 112 are shown for clarity in the illustrated example, there may be a large number of human-operated vehicles 102 of various different types, each having operator monitoring sensor(s) 114 for monitoring vehicle operators 112 on each human-operated vehicle 102 for collecting operator monitoring data 116 from the respective vehicle operators 112 at various locations.

Figure 2:
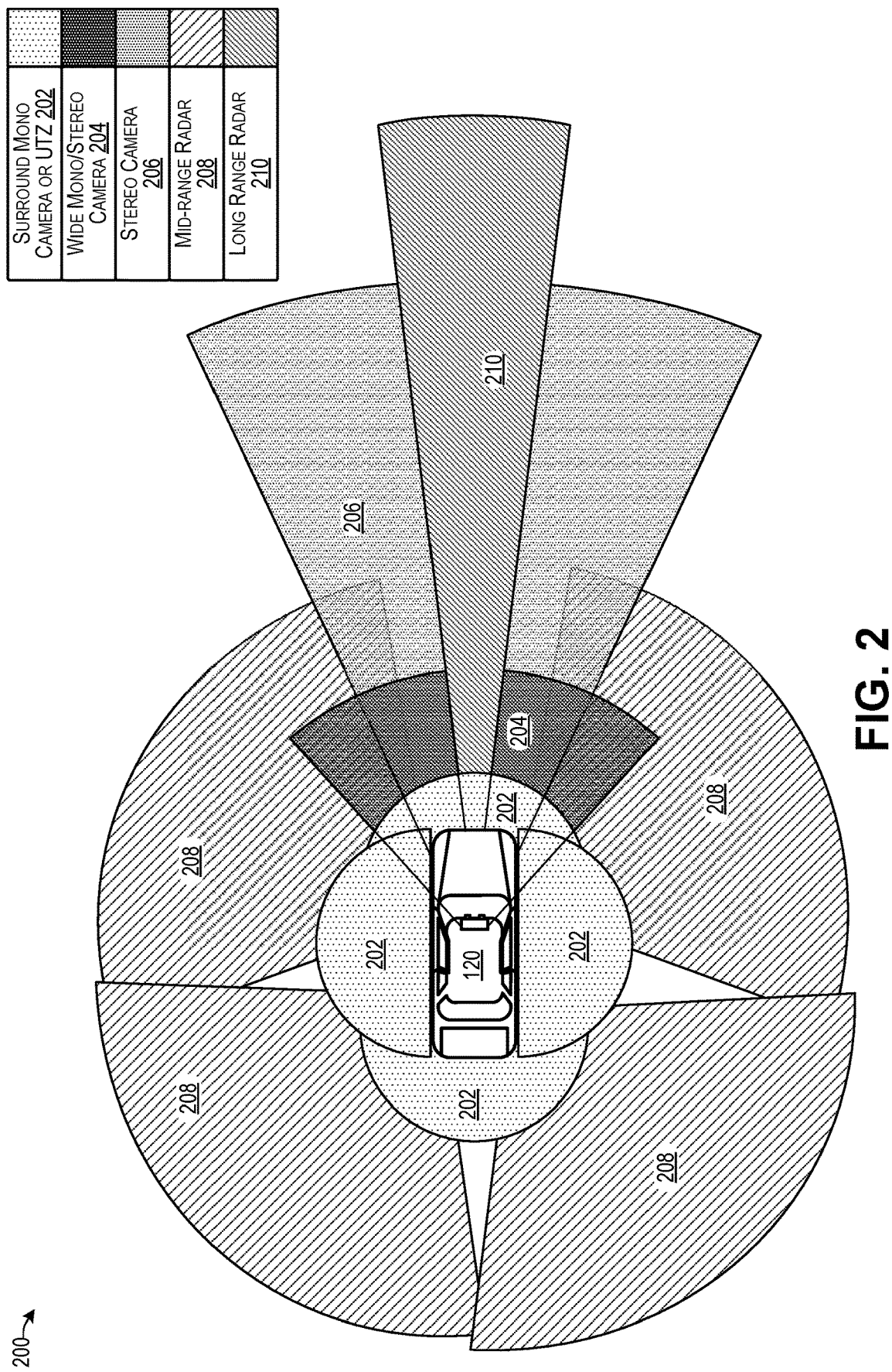
FIG. 2 illustrates an example of on-board sensor coverage for an ADAS/AD vehicle according to some implementations.

FIG. 2 illustrates an example 200 of on-board sensor coverage for an ADAS/AD vehicle 120 according to some implementations. ADAS/AD vehicle 120 may be equipped with a wide range of sensors to detect and recognize obstacles and signs in the path of the vehicle, as well as to navigate and avoid any collisions while partially or fully autonomous. For instance, as defined by the Society of Automotive Engineers (SAE), there are six levels of driving automation from Level 0 to Level 5. In particular, at "Level 0" (no driving automation) the driver performs all operating tasks like steering, braking, accelerating, and so forth. At "Level 1" (driver assistance), the vehicle can assist with some functions (e.g., cruise control), but the driver still handles all accelerating, braking, and monitoring of the surrounding environment. At "Level 2" (partial driving automation), the vehicle may assist with steering or acceleration functions and allow the driver to disengage from some of their tasks. Adaptive cruise control is one of the example of Level 2 autonomy.

The concept of autonomous driving mainly starts from "Level 3" (conditional driving automation), in which the vehicle itself may monitor the surroundings and may exert some control over the vehicle (e.g., autonomous parking). At Level 3, a driver must be able to take over. At "Level 4" (high driving automation) a vehicle may be able to drive independently most of the time but will not operate unless all conditions are met. At "Level 5" (full driving automation) the vehicle is able to drive anywhere in all conditions. There is no need for pedals or a steering wheel, as the autonomous vehicle system controls all critical tasks, monitors the surroundings, and identifies unique driving conditions, such as traffic jams, obstacles, road closures, and so forth.

For the higher levels of automation (i.e., Level 3 to Level 5), the ADAS/AD vehicle 120 may continuously monitor 360 degrees around the vehicle to avoid any obstacles and navigate safely. There are various different kinds of sensors and sensing techniques that may be used for ADAS/AD vehicles 120. Commonly used sensors may include mono cameras, stereo cameras, infrared cameras, radar, LIDAR, lasers, ultrasonic sensors, GPS receivers, and so forth. For any specific driver assistance system application or any specific level of driving automation, the sensors may be selected based on the advantages and disadvantages of the sensor type, which may include detection range, type of detection ability, power requirements, cost, amount of data generated, and the like. Each sensor type may have advantages and disadvantages, and thus, different types of sensors may be combined in use on the ADAS/AD vehicle 120 for improving accuracy in various weather or other types of conditions. For example, a single sensor type might not be able to meet recognition accuracy or range requirements in certain weather conditions.

As one example, a camera (mono/stereo) might not perform well in the dark or during inclement weather conditions, and the detection range may be comparatively low compared to similarly priced radar sensors. However, a radar sensor might not be able to detect a human and may have difficulty in detecting lane markers. On the other hand, a radar sensor may be a good candidate for long-range detection of other vehicles, as compared to other sensor types. As another example, an infrared camera may perform well under night conditions, but may also suffer from poor long-distance-detection capability. Additionally, a LIDAR sensor may perform well under night and day conditions, but may be costly and may generate huge amounts of data that may require a high capacity processor to process the data in real time. Further, while ultrasonic sensors are lower in cost than some other types of sensors, the detection range of ultrasonic sensors may be 10 meters or less, which may limit their usefulness. In view of the foregoing, multiple different sensor types are typically employed for ADAS/AD vehicles to continuously monitor the vehicle surroundings.

In the example of FIG. 2, the ADAS/AD vehicle 120 is equipped with multiple different sensors for 360-degree monitoring of the vehicle surroundings. In this example, the ADAS/AD vehicle 120 may be equipped with four surround mono cameras or ultrasound (UTZ) sensors, each a having a respective approximate detection area 202 as shown in FIG. 2. The ADAS/AD vehicle 120 may also be equipped with a forward-facing wide-angle mono or stereo camera having an approximate detection area 204 in front of the ADAS/AD vehicle 120. In addition, the ADAS/AD vehicle 120 may be equipped with a forward-facing stereo camera having an approximate detection area 206 in front of the ADAS/AD vehicle 120. Further, the ADAS/AD vehicle 120 may be equipped with four mid-range radar sensors have respective approximate detection areas 208 surrounding the ADAS/AD vehicle 120. Additionally, the ADAS/AD vehicle 120 may be equipped with a long range radar sensor having an approximate detection area 210 in front of the ADAS/AD vehicle 120. In some cases, a LIDAR sensor may be used in place of, or in addition to, one or more of the stereo camera, the long-range radar, or others of the above-discussed sensors. Further, while several example sensor configurations are discussed with respect to FIG. 2, numerous other sensor types, locations, and configurations will be apparent to those of skill in the art having the benefit of the disclosure herein. Accordingly, implementations herein are not limited to any particular sensor types, locations, or configurations.

FIG. 3 illustrates an example sensor management data structure 128 according to some implementations. The sensor management data structure 128 includes a listing of the sensors discussed above with respect to the example of FIG. 2 and the corresponding range and field of view for each of the listed sensors. In this example, the sensor management data structure 128 includes a sensor ID 302, a sensor status 304, a sensor type 306, a sensor location 308, a sensor range 310 (in meters) and a sensor FOV 312 (in degrees), although other information may be included in other examples.

At any point in time, e.g., for an upcoming road, intersection, or the like, the vehicle computing device 122 for the ADAS/AD vehicle 120 may access the corresponding location FOV data 118 for a current location based on information from the GPS receiver 144 to determine which sensors in the sensor management data structure 128 to activate or deactivate, as well as to determine the range of detection for individual ones of the sensors. In particular, the vehicle computing device 122 may compare the location FOV data 118 with the sensor FOV 312 for each sensor ID 1-11 for an upcoming location to determine which the sensors to activate or deactivate, or which sensor(s) may have a detection range adjusted. For example, as indicated at 314, suppose that the stereo camera is adjustable for a range of up to 200 meters, but may also be operated to sense information at a range less than 200 meters, e.g., down to 50 meters. Accordingly, for some use cases, the range of the stereo camera may be reduced to reduce the amount data from the stereo camera that is processed when performing certain maneuvers, such as making left or right turn.

Figure 4:
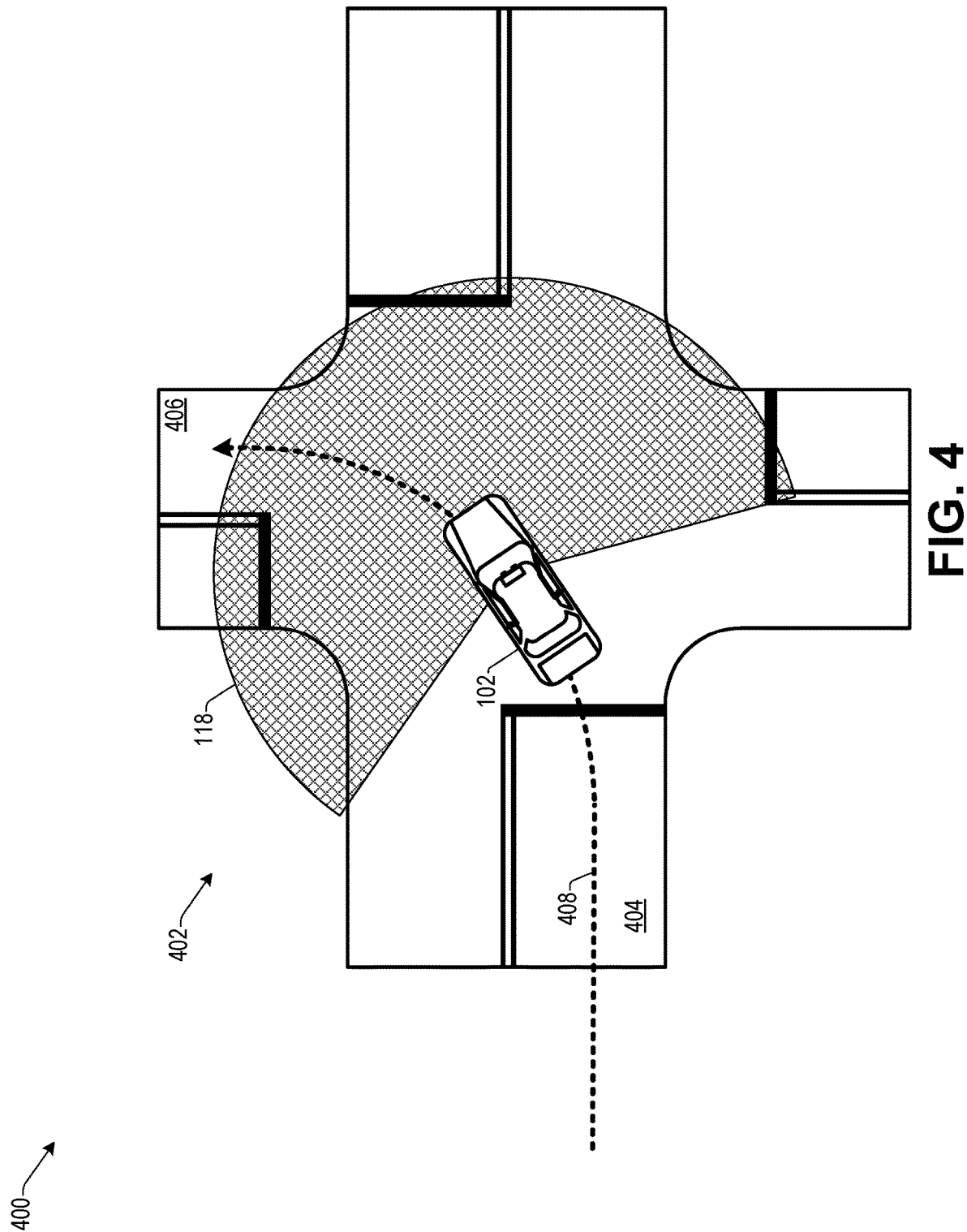
FIG. 4 illustrates an example of FOV map information determined for an intersection according to some implementations.

FIG. 4 illustrates an example 400 of location FOV data 118 determined for an intersection 402 according to some implementations. In this example, the human-operated vehicle 102 makes a left turn at the intersection 402 from a first street 404 to a second street 406, as indicated by dashed arrow 408. During this left turn, the operator monitoring system 115 discussed above with respect to FIG. 1 may collect operator monitoring data 116 about the vehicle operator's eye position (e.g., direction and extrapolated location of eye focus) head position, and so forth, as discussed above. Based on the operator monitoring data 116 and corresponding GPS location information determined concurrently, the vehicle computing device 104 of the vehicle 102 (or the service computing device in other examples) may determine the location FOV data 118 for the human-operated vehicle 102 at this location in the intersection 402. For example, the human operator may focus on certain areas at the intersection 402, such as to check for avoiding any obstacles, which may include on-coming traffic, pedestrians in, or about to enter, the roadway, or the like. The determined focus locations of the vehicle operator may be translated into a field of view around the human-operated vehicle 102 and merged to create the location FOV data 118. As mentioned above, location FOV data 118 for the intersection 402 may be generated by multiple different operators/vehicles, or by the same operator/vehicle multiple times, and may be merged using an averaging of mappings, a median of the mappings, or any of various other techniques, as will be apparent to those of skill in the art having the benefit of the disclosure herein. Thus, in some cases, the location FOV data 118 may include aggregated FOV data determined for a plurality of different humans who previously operated a respective vehicle at the particular location with which the particular location FOV data 118 is associated.

Figure 5:
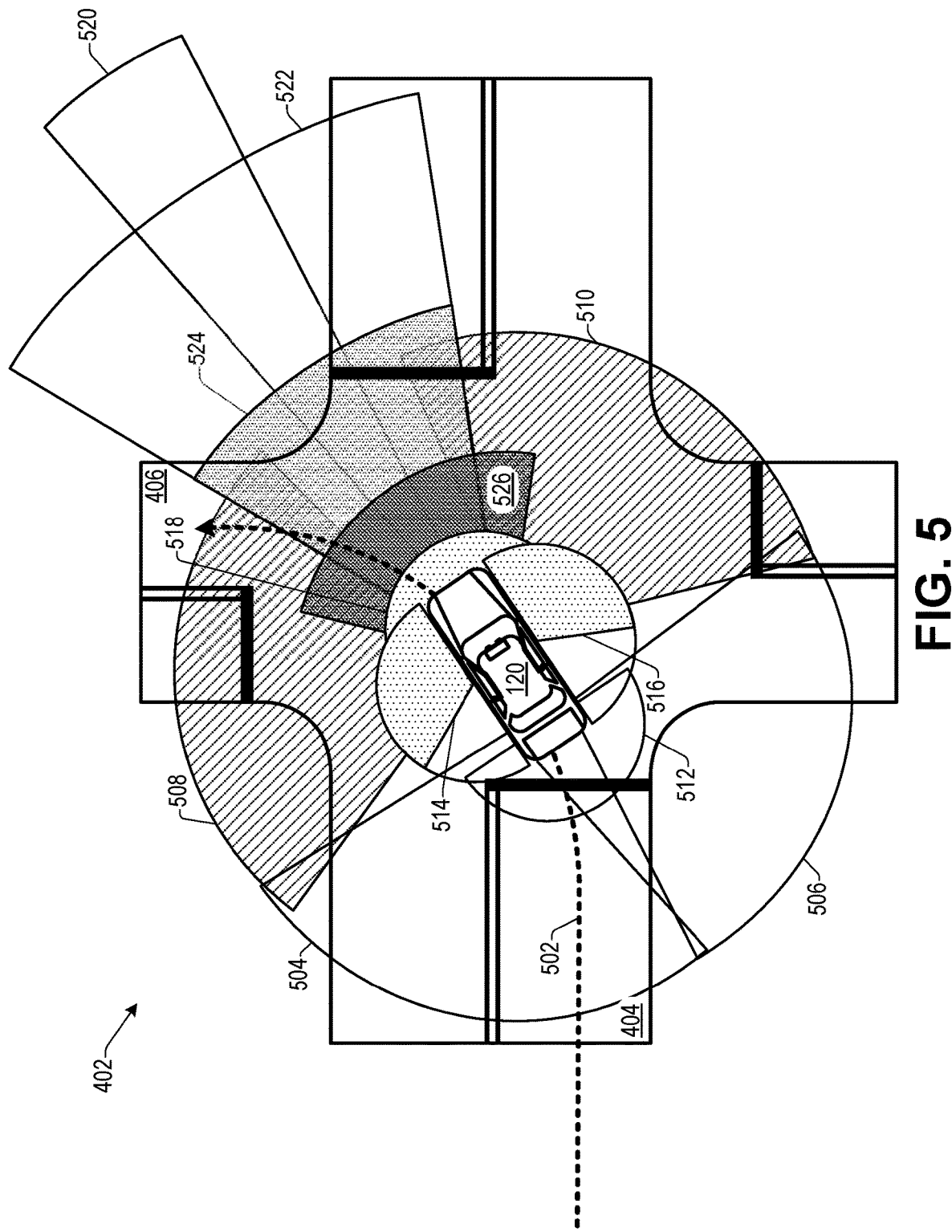
FIG. 5 illustrates an example of sensor deactivation and/or sensor range reduction according to some implementations.

FIG. 5 illustrates an example 500 of sensor deactivation and/or sensor range reduction according to some implementations. In this example, the ADAS/AD vehicle 120 is making a left turn at the intersection 402, from the first street 404 to the second street 406, as indicated by dashed arrow 408. During this left turn some of the sensors on the ADAS/AD vehicle 120 may be deactivated or operated at a reduced range to reduce the amount of sensor data that is processed before and during the left turn. For example, as discussed above with respect to FIG. 4, during a similar left turn performed by the human operator at the intersection 402, the human operator focused on certain areas to check for avoiding any obstacles, which may include on-coming traffic, pedestrians in, or entering, the roadway, or the like.

Prior to approaching the intersection 402, the vehicle computing device 122 on the ADAS/AD vehicle 120 may have accessed the location FOV data 118 for the upcoming intersection 402 to determine the location FOV data 118 illustrated in FIG. 4 or a descriptive equivalent thereof, such as a defined area around a portion of the vehicle that corresponds to the location FOV data 118 illustrated in FIG. 4. The vehicle computing device 122 may then determine how to control the sensors to cover at least the FOV area specified by the location FOV data 118 for the intersection 402.

In the illustrated example, based on the location FOV data 118 and current detected vehicle location, the vehicle computing device 122 may deactivate the mid-range radar for the rear half of the ADAS/AD vehicle 120, as indicated at 504 and 506 while leaving the midrange radar for the front half of ADAS/AD vehicle 120 active, as indicated at 508 and 510. In addition, based on the location FOV data 118 and current detected vehicle location, the vehicle computing device 122 may deactivate the surround mono camera and/or ultrasound sensor for the rear of the ADAS/AD vehicle 120, as indicated at 512. Additionally, the vehicle computing device 122 may reduce the FOV of the surround mono cameras and/or ultrasound sensors for the sides of the ADAS/AD vehicle 120 from 180 degrees to 125 degrees, as indicated at 514 and 516, while leaving the forward facing surround mono camera and/or ultrasound sensor active with the full 180 degree FOV, as indicated at 518. Furthermore, based on the location FOV data 118 and current detected vehicle location, the vehicle computing device 122 may deactivate the long-range radar sensor, as indicated at 520, and may reduce the effective range of the forward facing stereo camera from its original range, as indicated at 522, to a shorter range, as indicated at 524. Additionally, based on the location FOV data 118 and current detected vehicle location, the vehicle computing device 122 may leave the wide-angle forward facing mono or stereo camera active at its normal detection range, as indicated at 526.

As is apparent from FIG. 5, the sensors indicated by the location FOV data 118 to not be needed for the left turn may be deactivated or reduced in range, thereby substantially reducing the amount of sensor data to be processed by the vehicle computing device 122. Thus, the vehicle computing device 122 uses the location FOV data 118 to apply crowd-sourced human-based knowledge to temporarily deactivate and/or reduce the detection range of some of the sensors onboard the ADAS/AD vehicle 120. Thus, the amount of sensor data to be processed for making the left turn is reduced based at least in part on the location FOV data 118, which reduces the processing requirements of the vehicle computing device 122 without compromising vehicle safety.

In addition, in other examples, rather than entirely deactivating a sensor, the vehicle computing device 122 may sample the sensor at a lower sampling rate. For example, suppose a sensor, such as the rear-facing mono camera has a native sampling rate of 60 hertz. As one example, the vehicle computing device 122 may reduce the sampling rate of the camera from 60 hertz to 5 hertz. Thus the amount of sensor data received from the camera is reduced by a factor a 12, while the vehicle computing device 122 still receives some information regarding any vehicles behind the ADAS/AD vehicle 120. Furthermore, as an alternative to reducing the native sampling rate of a sensor, the vehicle computing device 122 may merely reduce the processing of signals received from the sensor, such as in the example above, only processing 1 in every 12 camera data signals received from the camera and ignoring the other 11 signals from the camera. In some cases, the reduced sampling rate may be based at least in part on how often the human driver checks in the corresponding direction. For example, if the human driver checks the review mirror several times before making a turn, the sampling rate might be higher than if the human driver does not check the review mirror at all. Numerous other variations will be apparent to those of skill in the art having the benefit of the disclosure herein.

Additionally, in the case that one of the sensors onboard the ADAS/AD vehicle 120 fails, the vehicle computing device 122 may access the location FOV data 118 to determine a route to a repair shop or other specified location that minimizes the use of the failed sensor. For instance, if a sensor on the left side of the ADAS/AD vehicle 120 fails, the vehicle computing device 122 may access the location FOV data 118 in the FOV map information database 124 to determine a route to the repair shop that minimizes use of the sensor on the left side of vehicle by determining a route that consists primarily of right-hand turns that do not use the sensor on the left side of the vehicle.

FIG. 6 illustrates an example of the sensor management data structure 128 corresponding to the left turn discussed with respect to FIG. 5 according to some implementations. Considering the vehicle navigation circumstances of the ADAS/AD vehicle 120, as discussed above with respect to FIG. 5, in which the ADAS/AD vehicle 120 is making the left turn at the intersection 402, one technique for determining which sensors 126 to keep active, and the FOV of each is these sensors 126 is to plotting the location FOV data 118 for the left turn. By comparing the sensor coverage of the sensors 126 for the ADAS/AD vehicle 120, the vehicle computing device 122 can determine which sensors to have active and which sensors to have inactive during the turn ("inactive" in some of the examples herein may also include temporarily reducing the sampling rate of the respective sensors for a period of time). For instance, the vehicle computing device 122 may simply overlay the location FOV data 118 onto a plot of the sensor coverage (e.g., as illustrated in FIG. 2) to determine the active sensors and corresponding desired FOVs for each active sensor. In some cases, the location FOV data 118 might not match perfectly with the sensor coverage. However, a threshold amount (for example ±5 percent) may be used to select the sensor range and FOV for the upcoming maneuver.

In the illustrated example, four sensors are inactive, as indicated at 702, 704, 706, and 708. In addition, two sensors have a modified FOV, as indicated at 710 and 712, e.g., the FOV for these two sensors (left and right mono camera and/or ultrasonic sensors) is reduced from 180 degrees to 125 degrees. Furthermore, as indicated at 714, the range for the stereo camera has been reduced from 200 meters to 100 meters.

Figure 7:
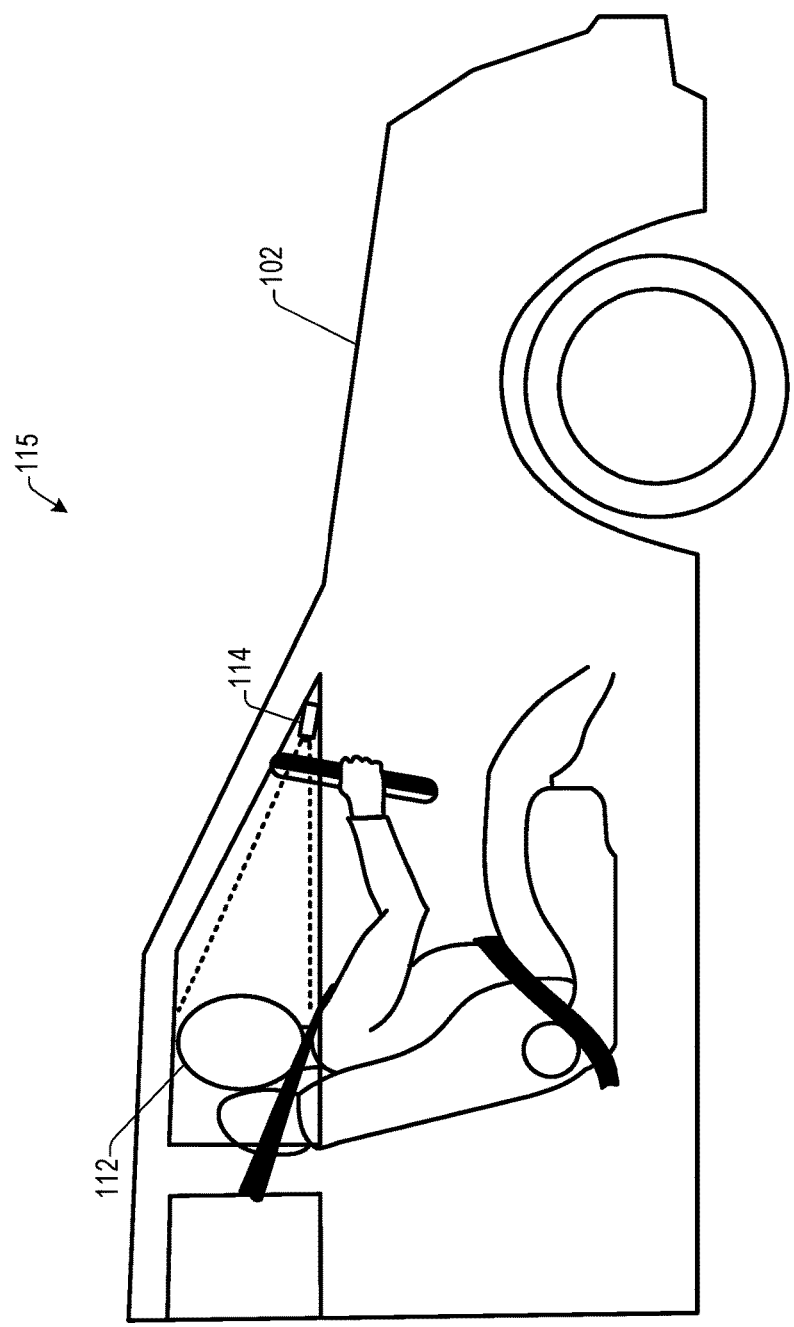
FIG. 7 illustrates an enlarged view of the example operator monitoring system discussed above with respect to FIG. 1 according to some implementations.

FIG. 7 illustrates an enlarged view 700 of the example operator monitoring system 115 discussed above with respect to FIG. 1 according to some implementations. As mentioned above, the operator monitoring system 115 may be installed on a large number of human-operated vehicles 102, and may be used to generated location FOV data 118 for all roads, intersections, parking lots, parking garages, and the like, on which ADAS/AD vehicles 120 might be expected to travel. In some examples, the operator monitoring system 115 may include one or more operator-monitoring cameras 114 for obtaining the eye position, head position, and so forth, of the vehicle operator 112 at a plurality of locations of interest. The operator monitoring data 116 obtained by the operator-monitoring camera(s) 114 may be used to determine location FOV data 118 for a corresponding location at which the operator monitoring data 116 was obtained.

The operator-monitoring camera(s) 114 may be installed on the dashboard of the human-operated vehicle 102, or at any of various other suitable locations inside the human-operated vehicle 102. For instance, the location of the camera(s) 114 may be varied based on the type of vehicle. A conventional RGB or infrared camera may be used for operator-monitoring camera(s) 114 herein. In some cases, a monitor or other display (not shown in FIG. 7) may be included in the human-operated vehicle 102, such as for displaying the operator states, notifying the operator that he or she is being recorded, and the like. In addition, the vehicle operator 112 may be able to turn off and turn back on the operator monitoring system 115, as desired, so that operator monitoring data 116 is only collected with the operator's permission.

FIGS. 8, 10, 11, 15 and 16 include flow diagrams illustrating example processes according to some implementations. The processes are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, systems and devices described in the examples herein, although the processes may be implemented in a wide variety of other environments, systems and devices.

Figure 8:
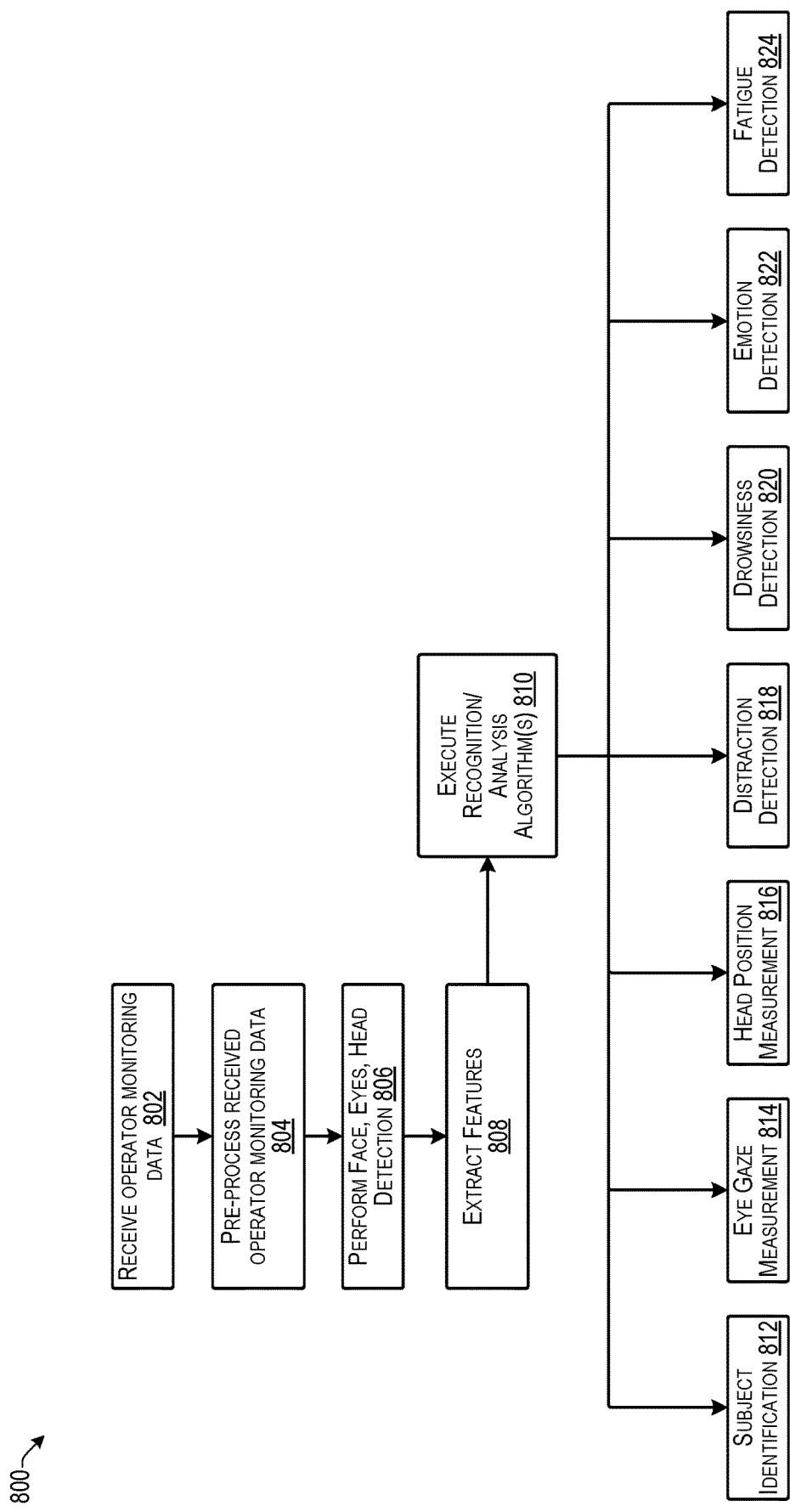
FIG. 8 is a flow diagram illustrating an example process for receiving and processing operator monitoring data according to some implementations.

FIG. 8 is a flow diagram illustrating an example process 800 for receiving and processing operator monitoring data according to some implementations. The example process may be executed by any suitable computing device programed to perform the algorithm for the process 800. For instance, in some cases, the process 800 may be performed by execution of the data management application 156 executing on the vehicle computing device 140 of the human-operated vehicle 102. Alternatively, in other cases, the process 800 may be performed by execution of the service program 166 on the service computing device(s) 108.

At 802, the computing device may receive the operator monitoring data 116 from the camera(s) 114. For instance, the camera(s) 114 may continuously record the vehicle operator 112 as the human-operated vehicle 102 is driven along various roads, through intersections, into parking lots, parking garages, driveways, and so forth.

At 804, the computing device may pre-process the received operator monitoring data 116. For example, the computing device may perform various type of actions on the received operator monitoring data 116, such as noise reduction, normalization, channel segmentation, image enhancement, format conversion, and so forth.

At 806, the computing device may detect the face, eyes and head of the vehicle operator from the pre-processed operator monitoring data 116, such as by using an image processing algorithm. The image processing algorithm may be either a traditional image processing algorithm and/or a machine-learning-based algorithm.

At 808, after the face, eyes and head of the operator have been detected from the image(s), the computing device may extract features. For example, the features may include various points on the face, eyes, and other parts of the operator's head and body that may be used for determining eye position, gaze estimation, focal point, or the like. For example, an initial gaze estimation may be performed at this stage, but a final eye gaze measurement and focal point determination may be performed at 810.

At 810, after the extraction of facial key points and various other features is completed, in depth processing of the extracted features may be performed. For example, the extracted features may be used with recognition analysis algorithms to perform subject identification 812, eye gaze measurement 814 (e.g., determining a focal point relative to the vehicle), head position measurement 816, distraction detection 818, drowsiness detection 820, emotion detection 822, fatigue detection 824, and the like. Software for performing these recognition functions is commercially available, as is known in the art, and is not described herein in detail.

Figure 9:
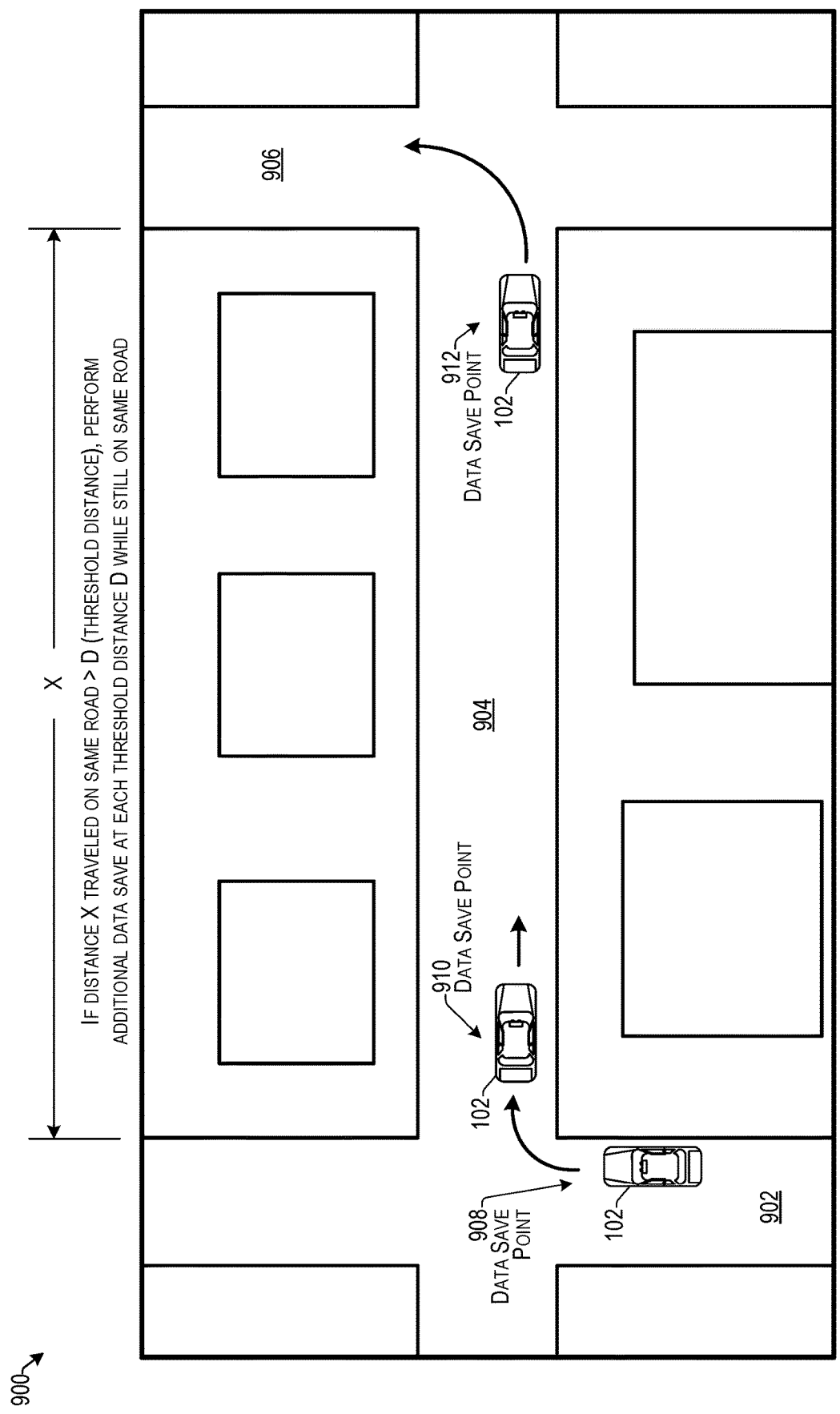
FIG. 9 illustrates an example of collecting data using the vehicle operator monitoring system according to some implementations.

FIG. 9 illustrates an example 900 of collecting data using the vehicle operator monitoring system 115 according to some implementations. As mentioned above, the operator monitoring system 115 of the human-operated vehicle 102 may collect operator monitoring data 116 at a plurality of different locations under various different driving conditions, different traffic conditions, different times of day, and so forth, for creating the location FOV data 118. The vehicle operator's head posture and gaze direction, focal point, etc., may indicate the vehicle operator's FOV at a given location. The location FOV data 118 may be created by plotting the vehicle operator's field of view on a map of the corresponding location, such as may be determined from location information received from the GPS receiver 125 discussed above with respect to FIG. 1.

The location to which the generated location FOV data 118 corresponds may be referred to as a "data save point". For instance, the sensors an ADAS/AD vehicle 120 may be set (or reset) at each data save point based on the location FOV data 118 for that data save point as the ADAS/AD vehicle 120 traverses the data save point.

In the example of FIG. 9, suppose that a human operated vehicle is being driven along a first street 902, makes a right turn onto a second street 904, and makes a left turn onto a third street 906. Accordingly, the operator monitoring system 115 may create a data save point 908 when the human operated vehicle 102 makes the right turn from the first street 902 to the second street 904. Additionally, after the human operated vehicle turns on to the second street 900 for the human operated vehicle may create a nether data save point 910 correspond to navigation straight on the second street 904. Depending on the length of the second street 904, the operator monitoring system 115 may create additional data save points. For example, if the distance traveled on the second road 904 is equal to X, and if X is greater than a predetermined threshold distance D, the operator monitoring system 115 may create an additional data save point each time the threshold distance D is reached while the human operated vehicle 102 is traveling on the same road. When the human operated vehicle 102 turn the left from the second street 904 onto the third street 906, a data save point 912 may be created. As mentioned above, location FOV data 118 may be sent to the FOV map information database 124 for each data save point 908, 910, and 912 created.

The FOV map information database 124 may be built and expanded using the human-operated vehicles 102 equipped with above-described driver monitoring system 115. In this manner, crowd-sourced location FOV data 118 may be created for every location at which an ADAS/AD vehicle 120 might operate. In the case of a straight road, it is typically not necessary to generate a large number of data save points for the entire straight road, as the required sensors typically does not change. Accordingly, the distance between two data save points on a straight road may be determined based on the predetermined threshold distance D.

On the other hand, location FOV data 118 may be created for most intersections. However, in some cases, similar intersections may be identified, such as based on matching using mapping information available online from, e.g., GOOGLE®, APPLE®, MAPQUEST®, or the like. Accordingly, rather than having to create location FOV data 118 for each intersection, intersections that have been determined to have a similar configuration may share FOV mapping information 118. For instance, FOV mapping information 118 created for a first intersection may be applied to one or more second intersections that have been identified using online mapping information as having the same configuration as the first intersection. Therefore, previously captured location FOV data 118 for the first intersection may be applied for the first intersection and a plurality of other intersections that have been identified as being sufficiently similar to the first intersection, such as by having the same number of lanes for each street included in the intersection, similar street widths, similar intersection dimensions, similar number of crosswalks, similar traffic lights or traffic signs, and so forth.

In addition, as mentioned above, the driver alertness, drowsiness, distraction, etc., may be monitored at every data save point. If the data processing algorithm (e.g., as discussed above with respect to FIG. 8) determines that the driver is not alert, is distracted, or the like, then the operator monitoring data collected for that data save point may be ignored, discarded, or otherwise not used to create FOV map information for that location. In some cases, the alertness of the vehicle operator may be determined based on using any of various commercially available recognition algorithms able to detect drowsiness, distraction, emotion, and/or fatigue level of the vehicle operator.

The location FOV data 118 can be created using single driver data or using multiple driver data. For example, different drivers using different vehicles, different types of vehicles, different height drivers, and so forth may be used to ensure a robust database. In the case in which multiple driver data is used to create the location FOV data 118 for the same location, an average and maximum (e.g., within a threshold of the average) location FOV data 118 may be created for that location. Further, drivers having good driving records might be given a higher priority to contribute in making the location FOV data 118 for any location.

To convert the vehicle operator's gaze and head posture direction into the location FOV data 118, a vehicle model may be used in conjunction with a road map, such as may be obtained from one of the online sources mentioned above. For instance, a driving simulator that may include a driver-surrounding display, steering wheel, gear shift, etc. may be used to test the driver monitoring system with a plurality of operators. In the driving simulator, different operators' gaze and head posture may be measured and corresponding FOV may be recorded. Further, during the simulation testing, the operators may be asked to provide input to correct the location FOV data 118. This simulation testing may be conducted for subjects having different heights and may be conducted while changing other parameters of the driving simulator to emulate different vehicle models, vehicle types, and so forth. Based on the simulator test data, a machine learning model or other computational model may be created that is able to calculate a driver's field of view (i.e., driver's vision range, focal point, and field of view) using driver's gaze (eye position), head position, height, vehicle model (seat height, location, etc.), vehicle location, and map data. In some cases, both statistical and neural network models may be used for the computational model.

Figure 10:
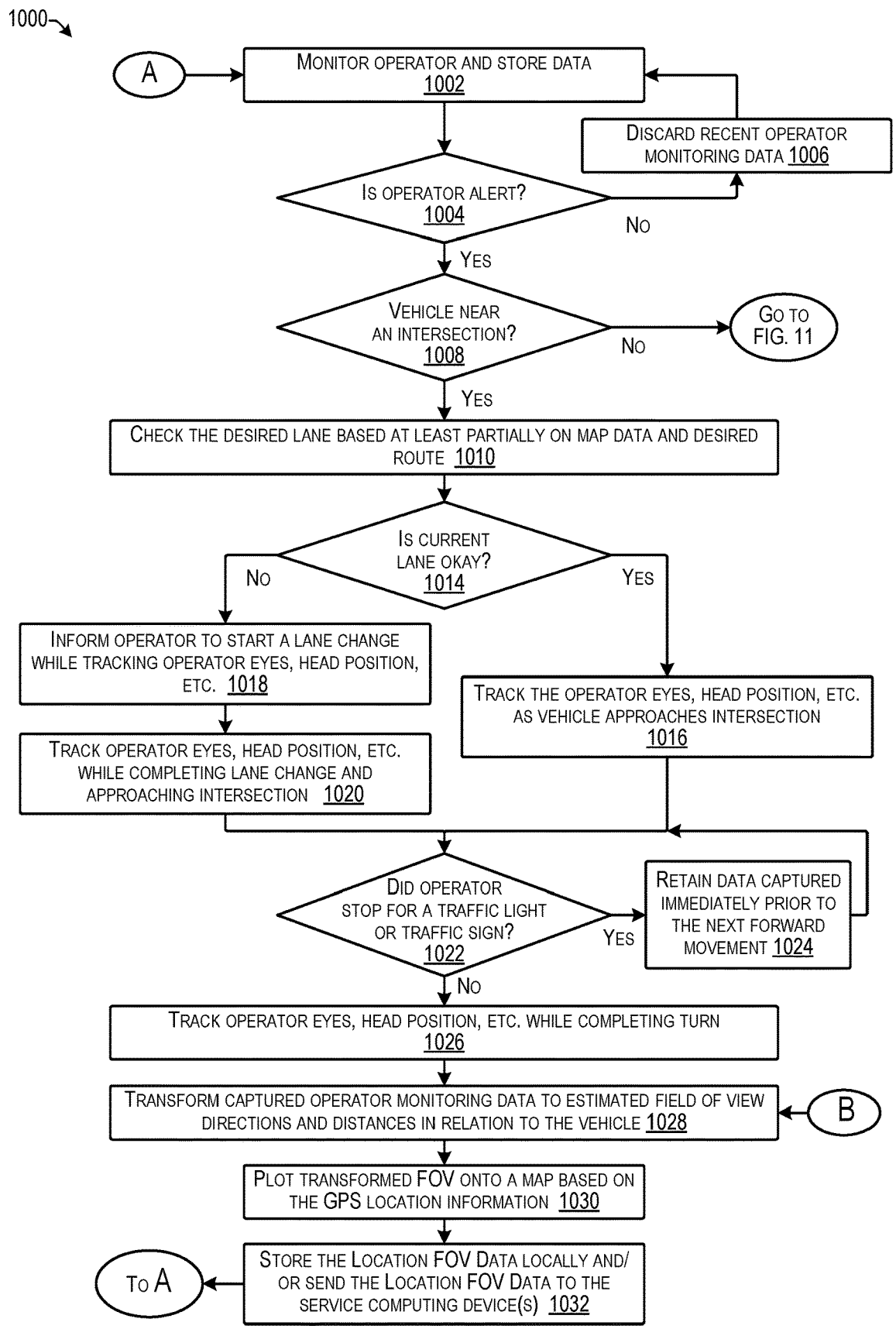
FIGS. 10 and 11 are flow diagrams illustrating an example process for receiving vehicle operator monitoring data and generating FOV map information according to some implementations.
Figure 11:
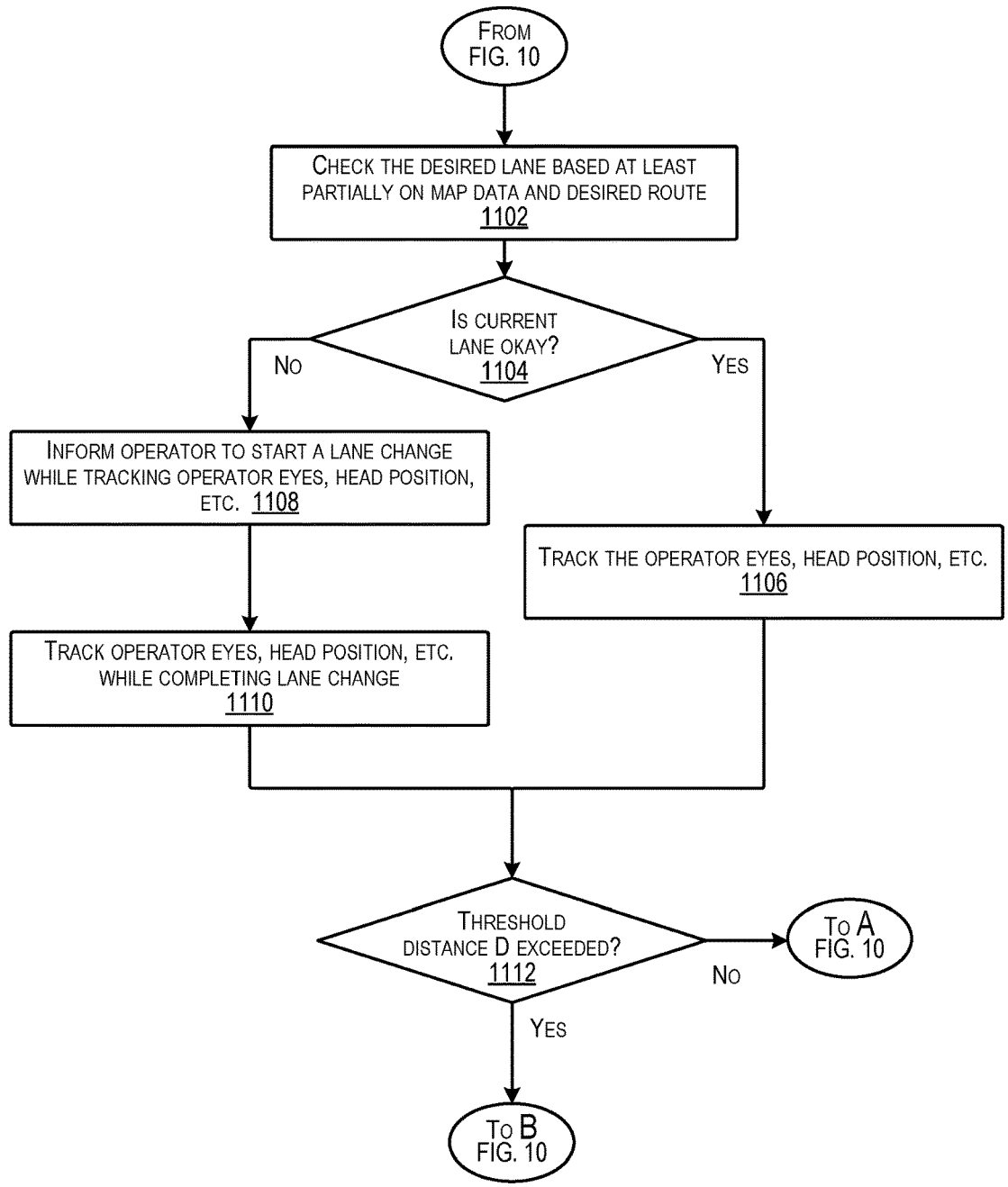

FIGS. 10 and 11 are flow diagrams illustrating an example process 1000 for receiving vehicle operator monitoring data 130 and generating location FOV data 118 according to some implementations. In some cases, the data capture procedure may depend in part on the type of road and the configuration of the route to be traveled. For instance, in the case of the vehicle traveling down a straight road, the operator monitoring data capture procedure may be different than in the case of the vehicle turning at an intersection. There is typically more operator monitoring data to capture at an intersection, as a driver may check the desired lane based on the destination, check the traffic light, and make a turn or go straight. Thus, the process 1000 includes different scenarios, such as (a) data capture while driving on a straight road; (b) data capture at an intersection—going straight through the intersection; and (c) data capture at an intersection—making a turn at the intersection.

The process 1000 may be executed by a suitable computing device, such as the vehicle computing device 104, which may use the GPS receiver 125 to track the location of the human-operated vehicle in relation to map information to determine when the human operated vehicle is approaching an intersection, or the like, to ensure that data capture of the operator monitoring data is performed with respect to the intersection, as well as at other times. Accordingly, the operator monitoring system 115 may use the location information provided by the GPS receiver 125 to determine when to save the operator monitoring data as location FOV data 118, thereby reducing the overall amount of location FOV data 118 generated by focusing on generating the location FOV data 118 at locations where there is more likely to be a change to the active and inactive sensors, such as at intersections.

At 1002 of FIG. 10, when the vehicle operator 112 has activated the operator monitoring system 115, the computing device may continuously receive operator monitoring data 116 for the vehicle operator 112 and may store the received operator monitoring data 116 in association with corresponding location data determined from the GPS receiver 125.

At 1004, the computing device may determine whether the vehicle operator 112 appears to be alert, e.g., based on the process 800 of FIG. 8 discussed above. If so, the process goes to 1008. If not, the process goes to 1006.

At 1006, if the computing device determines that the vehicle operator 112 is not alert, the computing device may discard the recently captured operator monitoring data 116, and may return to block 1002. For example, as discussed above with respect to FIG. 8, if the computing device determines that the vehicle operator 112 is drowsy, distracted, fatigued, or otherwise not alert, then the corresponding recently collected operator monitoring data 116 may be considered to possibly be inaccurate, and may be discarded or otherwise not used.

At 1008, on the other hand, if the computing device determines that the vehicle operator 112 appears to be alert, then the computing device may determine whether the human-operated vehicle 102 is near an intersection. For example, as mentioned above, the computing device may track the location of the human-operated vehicle 102 continuously using the GPS receiver 125 and may determine when the human-operated vehicle 102 is approaching an intersection based on the GPS information. If the human-operated vehicle 102 is near an intersection, the process may go to 1010. If the human-operated vehicle 102 is not near an intersection, the process may go to FIG. 11 block 1102.

At 1010, the computing device may check the desired lane based at least partially on map data and desired route. For example, if the route indicates that the vehicle should turn at the intersection, the vehicle may need to move to the correct lane to make the turn.

At 1012, the computing device may determine whether the current lane is okay. If so, the process goes to 1016. If not, the process goes to 1018.

At 1016, when the computing device determines that the current lane is okay, the computing device may track the operator eyes, head position etc. as the vehicle approaches the intersection.

At 1018, when the computing device determines that the current lane is not okay, the computing device may inform the operator to start a lane change while monitoring the operator eyes, head position, etc.

At 1020, the computing device may continue to track the operator eyes, head position, etc., while the lane change is completed.

At 1022, the computing device may determine whether the human-operated vehicle 102 stopped for a traffic light or traffic sign. For example, based on the GPS receiver information and/or other sensors, such as an accelerometer in the human-operated vehicle 102, the driver monitoring system 115 may determine if the human-operated vehicle 102 has come to a stop at or near the intersection. If so, the process goes to 1024. If not, the process goes to 1026.

At 1024, the computing device may retain data eye and head position data, etc., captured immediately prior to the next forward movement of the human-operated vehicle 102. For example, when a vehicle is stopped at a traffic light, the driver may look around, perform various actions inside the vehicle, etc., that are unrelated to driving the vehicle. However, when the light changes, the driver may check the light, check the intersection, and so forth before accelerating. Consequently, the operator monitoring data 116 received a second or two before the vehicle accelerates is useful for determining operator FOV for entering the intersection. The process may traverse block 1022 again in case the human-operated vehicle 102 has to stop again before being able to enter the intersection.

At 1026, the computing device may track operator eyes, head position, etc. while completing the turn through the intersection.

At 1028, the computing device may transform captured operator monitoring data to estimated field-of-view directions and distances in relation to the vehicle.

At 1030, the computing device may plot the transformed FOV on to a map based on the GPS location information to generate location FOV data 118.

At 1032, the computing device may store the location FOV data 118 locally and/or may send the location FOV data 118 to the service computing device 108. The process may then return to block 1002 to continue monitoring the vehicle operator. Additionally, as mentioned above, in some cases, the vehicle computing device 104 may send the received operator monitoring information 116 and the GPS location information to the service computing device(s) 108, and the service computing device(s) 108 may perform the operations of blocks 1028 and 1030.

FIG. 11 illustrates a continuation of the process 1000 from block 1008 of FIG. 10.

At 1102 of FIG. 11, when the vehicle is not approaching an intersection, e.g., is traveling on the same road for some distance, the computing device may check the desired lane based at least partially on map data and desired route.

At 1104, the computing device may determine whether the current lane is okay. If so, the process goes to 1106. If not, the process goes to 1108.

At 1106, when the current lane is determined to be okay, the computing device may track the operator eyes, head position, etc.

At 1108, on the other hand, when the current lane is not okay, the computing device may inform the operator to start a lane change while tracking the operator eyes, head position, etc.

At 1110, the computing device may continue to track the operator eyes, head position, etc. while completing the lane change in after the lane changes been completed.

At 1112, the computing device may determine whether the threshold distance D has been exceeded on the current road. For example, as discussed above, e.g. with respect to FIG. 9, the driver monitoring system 115 may be configured to periodically generate additional location FOV data 118 when the human-operated vehicle 102 has traversed a predetermined distance D along the same road. If the threshold distance D has been exceeded, the process goes to block 1026 of FIG. 10 to generate location FOV data 118. On the other hand, if the threshold distance D has not yet been exceeded, the process goes to block 1002 of FIG. 10 to continue monitoring the vehicle operator 112.

Figure 12:
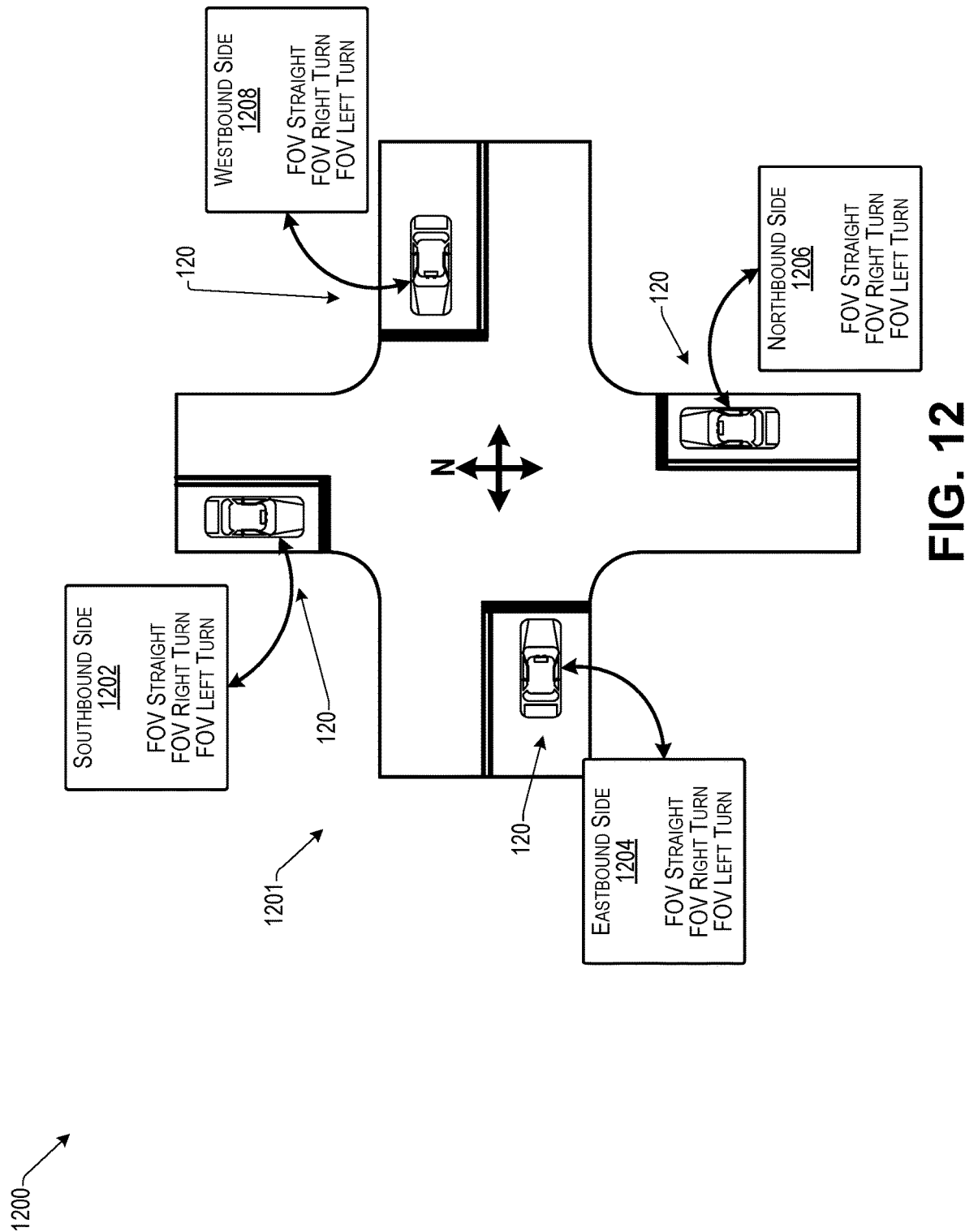
FIG. 12 illustrates an example of FOV map data for an intersection that may be maintained in the FOV map information database according to some implementations.

FIG. 12 illustrates an example 112 of FOV map data for an intersection 1201 that may be maintained in the FOV map information database 124 according to some implementations. In the case of a vehicle approaching an intersection, a driver may typically (a) check the lane to use, e.g., determine whether to change lanes or use the same lane, such as based on the destination GPS information; (b) check the traffic light or traffic sign, if any; and (c) make the turn. The driver monitoring data 116 may be stored for each of these steps and mapped as (a) location FOV data 118 for the lane to use; (b) location FOV data 118 for checking the traffic light/sign; and (c) location FOV data 118 for completing the turn.

As illustrated in FIG. 12, location FOV data 118 may be generated for each intersection, and for each side of the intersection 1201. For example, in case of a two-road intersection with multiple lanes, four sets of location FOV data 118 may be created for each of the four sides of the intersection, which in the illustrated example, include a southbound side 1202, and eastbound the side 1204, a northbound side 1206, and a westbound side 1208. The location FOV data 118 for each of the sides 1202-1208 may include FOV of proceeding straight, FOV for right turn, and FOV for left turn. Accordingly, the ADAS/AD vehicle 120 may access the appropriate location FOV data 118 for the appropriate side of the intersection prior to approaching the intersection 1201, such as by accessing the FOV map information database 124, or by accessing a local database or other data structure maintained on the ADAS/AD vehicle 120.

Figure 13A:
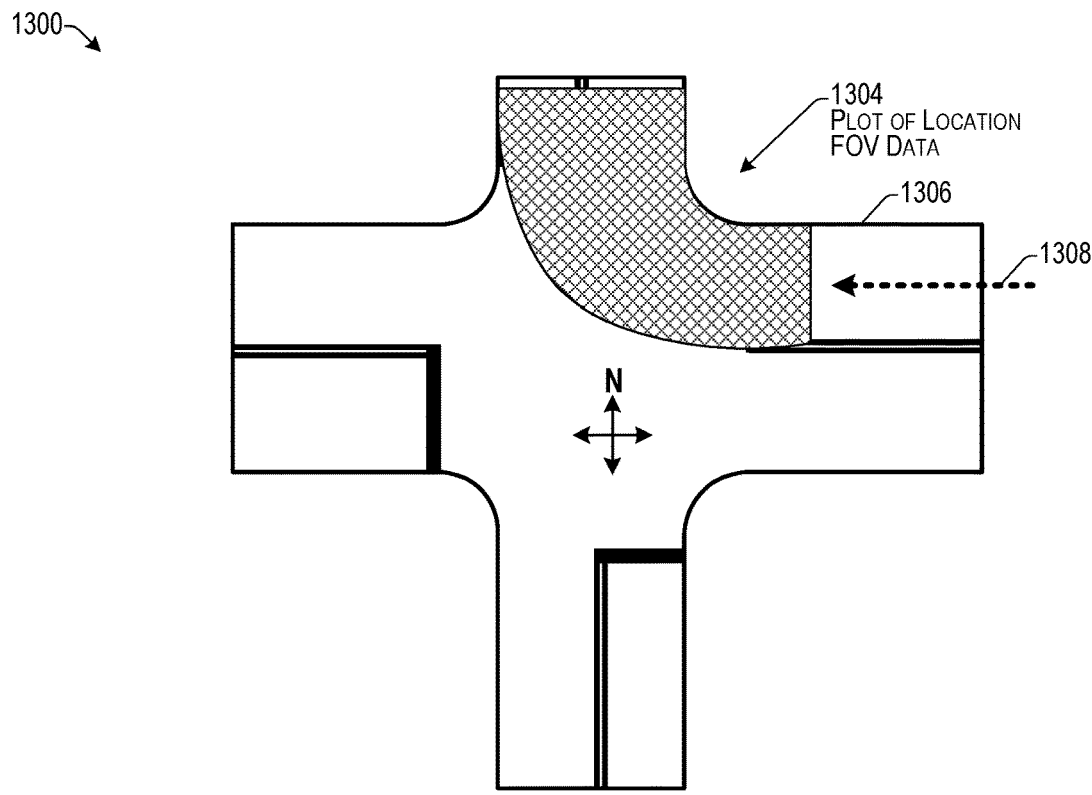
FIGS. 13A and 13B illustrate examples, respectively, of FOV map information plotted on a map for an intersection according to some implementations.
Figure 13B:
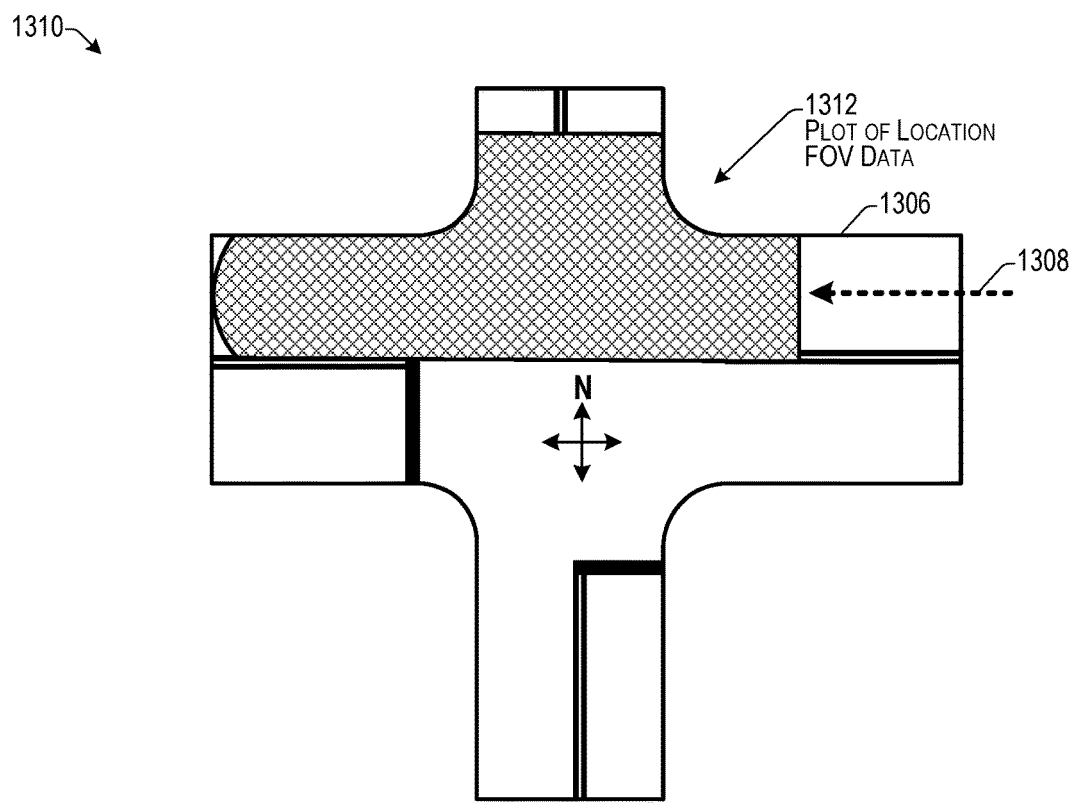

FIGS. 13A and 13B illustrate examples 1300 and 1310, respectively, of location FOV data 118 plotted on a map for an intersection 1302 according to some implementations. FIG. 13A illustrates a plot 1304 of the location FOV data 118 determined based on operator monitoring data 116 collected when a human-operated vehicle 102 made a right turn at the intersection 1302 when approaching from the westbound side 1306, as indicated by dashed arrow 1308. As mentioned above, based on monitoring of the vehicle operator's gaze and head position, the field of view may be estimated and plotted onto a map of the location. In some cases, the FOV estimation may vary, such as based on the type and/or model of the human-operated vehicle 102.

Similarly, FIG. 13B, at 1310, illustrates a plot 1312 of the location FOV data 118 determined based on operator monitoring data 116 collected when a human-operated vehicle 102 proceeded straight through the intersection 1302 when approaching from the westbound side 1306, as indicated by the dashed arrow 1308. Based on monitoring of the vehicle operator's gaze and head position, the field of view may be estimated and plotted onto a map of the location.

Figure 14:
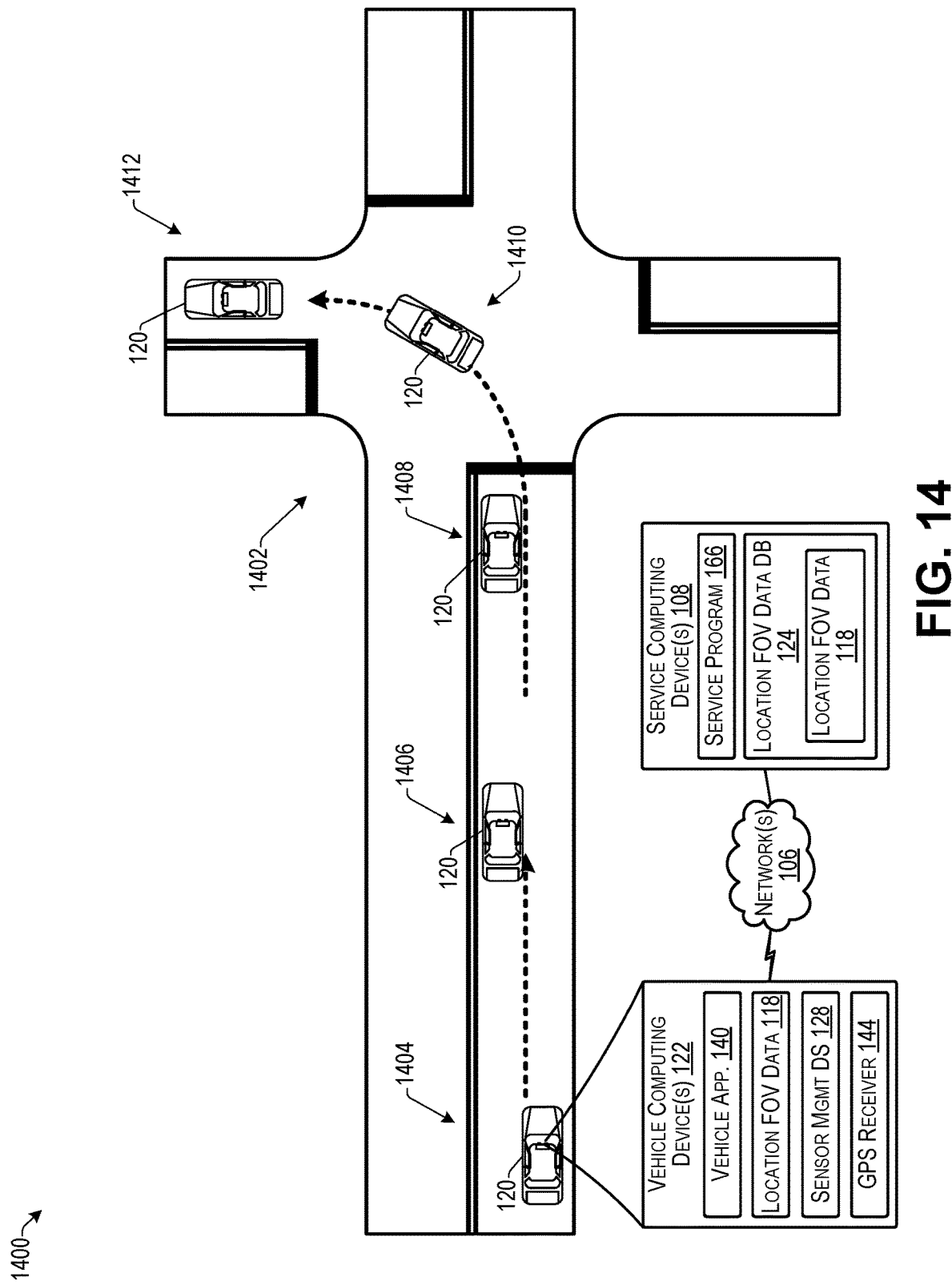
FIG. 14 illustrates an example of an ADAS/AD vehicle utilizing the FOV map information for vehicle control according to some implementations.

FIG. 14 illustrates an example of an ADAS/AD vehicle utilizing the location FOV data 118 for vehicle control according to some implementations. In some examples, after a driver operated vehicle 102 equipped with the operator monitoring system 115 creates the location FOV data 118 for a given location, the ADAS/AD vehicle(s) 120 can use that location based location FOV data 118 when navigating the location. After the location based location FOV data 118 has been created, an ADAS/AD vehicle 120 that is following the same route is able to access the location FOV data 118 sequentially for controlling the sensors over a plurality of different steps (e.g., lane check, traffic light/sign check, make turn, etc.) corresponding to different locations along the route traveled by the ADAS/AD vehicle 120.

Initially, prior to approaching the intersection 1402, the vehicle computing device 122 on the ADAS/AD vehicle 120 may ensure that the location FOV data 118 is accessible to the vehicle computing device 122, e.g., stored in a local memory, or the like. If not, the vehicle computing device 122 may download, from the FOV map information database 124, the location FOV data 118 for the upcoming intersection 1402 at any time before approaching the intersection 1402, e.g., after the route is determined, or while the ADAS/AD vehicle 120 is traveling along the route.

As one example, at location 1404, the vehicle computing device 122 may access the location FOV data 118 for the location 1404 and may check the lane. To change to the correct lane for making a left turn, the vehicle computing device 122 may apply the appropriate sensor settings corresponding to the location FOV data 118 for the location 1404 for changing lanes. At location 1406, the vehicle computing device 122 may access the location FOV data 118 for location 1406 and may set the sensors for checking the traffic light/traffic sign. At location 1408 before proceeding through the intersection 1402, the vehicle computing device 122 may access the location FOV data 118 for location 1408, and may set the sensors accordingly for making the left turn, as indicated at 1410. At location 1412, the vehicle computing device 122 may access the location FOV data 118 for location 1412, and may set the sensors accordingly, for proceeding straight following the turn.

Accordingly, implementations herein may consecutively optimize the usage of sensors and corresponding algorithms executed by the vehicle computing device 122 for sensing the surroundings of the ADAS/AD vehicle 120 for safely controlling the ADAS/AD vehicle 120 during navigation on roads. As mentioned above, the location FOV data 118 can be stored in the local storage media of the ADAS/AD vehicle 120 and/or can be received wirelessly, such as by using a cellular network (4G, LTE, 5G, etc.), Wi-Fi, Dedicated Short Range Communications (DSRC), or the like.

In case of an ADAS/AD vehicle 120, e.g., with centralized data flow architecture in which all the sensors raw data are processed by a central ECU, the location FOV data 118 may be processed by the central ECU for activating an optimal array of selected sensors and corresponding algorithms according to the location FOV data 118 for the current location of the ADAS/AD vehicle 120. Additionally, in the case of an ADAS/AD vehicle 120 with a distributed data flow architecture in which the sensors process their own data in the sensors' own embedded systems and send recognition results to a central ECU, the location FOV data 118 may be employed at either the sensors' embedded systems, the central ECU, or both, to optimize/select the sensors and algorithms for performing the upcoming navigation.

Figure 15:
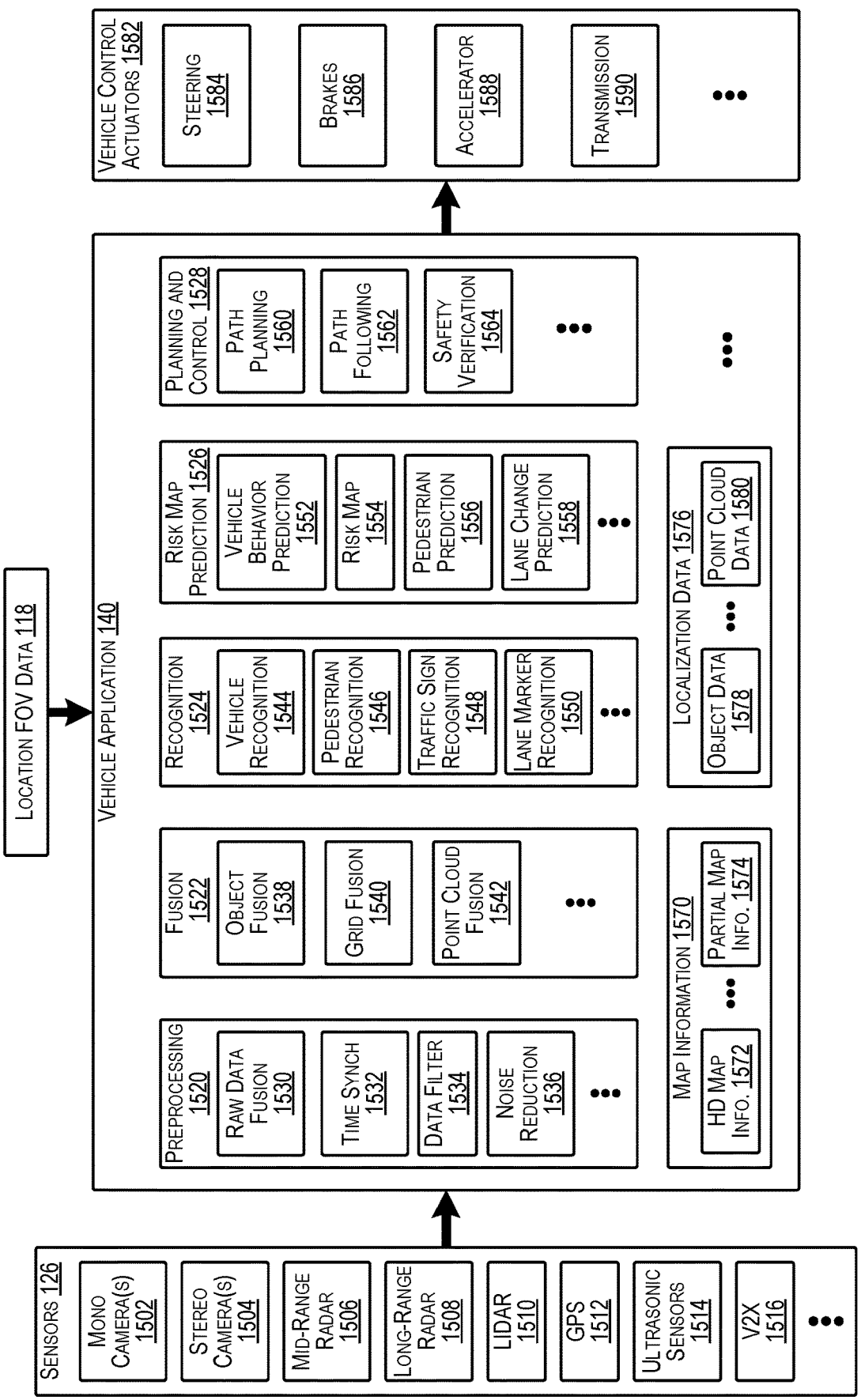
FIG. 15 illustrates an example of operation of a portion of the vehicle application executed by the vehicle computing device(s) of the ADAS/AD vehicle according to some implementations.

FIG. 15 illustrates an example of operation of a portion of the vehicle application 140 executed by the vehicle computing device(s) 122 of the ADAS/AD vehicle 120 according to some implementations. For instance, the vehicle application 140 may include or may access a plurality of algorithms to enable navigation and other control of the ADAS/AD vehicle 120 based in part on sensor information received from the sensors 126. Similar to the sensor optimization discussed above, the location FOV data 118 may also be used to optimize a plurality of autonomous driving algorithms executed by the vehicle computing device(s) 122 under control of the vehicle application 140.

As illustrated in FIG. 15, the sensors 126 may include one or more of mono camera(s) 1502, stereo camera(s) 1504, mid-range radar 1506, long-range radar 1508, LIDAR 1510, GPS, 1512, ultrasonic sensors 1514, and V2X (vehicle-to-everything) communications. Furthermore, while several types of sensors 126 are listed in this example, various other types of sensors may be included in addition to, or instead of, those listed, as will be apparent to those of skill in the art having the benefit of the disclosure herein.

A plurality of different types of algorithms (e.g., subfunctions, subroutines, modules, applications, executable code, or the like) may be executed to perform various functions. Some of these algorithms may use some of the sensor data from the sensors 126 as direct input, while others do not. The algorithms are grouped into a plurality of groups, such as based on function, which in this example include preprocessing 1520, fusion 1522, recognition 1524, risk map prediction 1526, and planning and control 1528.

Examples of preprocessing algorithms 1520 may include raw data fusion 1530, time synchronization 1532, data filtering 1534, and noise reduction 1536. Examples of fusion algorithms 1522 may include object fusion 1538, grid fusion 1540, and point cloud fusion 1542. Examples of recognition algorithms 1524 may include vehicle recognition 1544, pedestrian recognition 1546, traffic sign recognition 1548, and lane marker recognition 1550. Examples of risk prediction map risk map prediction algorithms 1526 may include vehicle behavior prediction 1552, risk map 1554, pedestrian prediction 1556, and lane change prediction 1558. Examples of planning and control algorithms 1528 include path planning 1560, path following 1562, and safety verification 1564.

Furthermore, the vehicle application 140 may access localization In addition, the vehicle application 140 may access map information 1570 which may include high definition map information 1572 and partial map information 1574. Further, the vehicle application 140 may access localization data 1576, which may include object data 1578 and point cloud data 1580. Additionally, while several types of algorithms and data are described in this example, numerous other types of algorithms and data will be apparent to those of skill in the art having the benefit of the disclosure herein.

The planning and control algorithms 1528 may be executed for determining one or more control signals to send to one or more vehicle control actuators 1582. Examples of vehicle control actuators 1582 that may be controlled by algorithms of the vehicle application 140 may include steering 1584, brakes 1586, accelerator 1588, and transmission 1590.

By execution of one or more of the algorithms 1530-1534, the vehicle application 140 may perform various different functions including data preprocessing, fusion, perception, cognition, behavior prediction, risk map prediction, planning, etc. In conventional autonomous driving systems, all the algorithms might execute concurrently all the time, which may require high memory capacity and processing power. However, by using location FOV data 118 herein, several algorithms can be deactivated based on the current location of the vehicle.

As one example, suppose the ADAS/AD vehicle 120 is currently traversing a road with a substantial distance between two intersections. In such a situation, there is no need to activate the pedestrian prediction motion algorithm 1556. Similarly, during single lane intersection turning the lane change prediction algorithm 1558, which is used to predict the lane change for the ADAS/AD vehicle 120 may be deactivated. Additionally, the data preprocessing algorithms 1520 for the deactivated sensors 126 might not be executed, which will save processing capacity and processing time. Thus, the location FOV data 118 may be used to realize lower memory and high-speed operation by optimizing the execution various algorithms by the vehicle application 140 for control of the ADAS/AD vehicle 120.

As discussed above, various algorithms executed by the vehicle application 140 may be left unexecuted based on the location FOV data 118 for a particular geographic location of the ADAS/AD vehicle 120. Further, the algorithms executed may be varied based on the level of automation of the ADAS/AD vehicle 120, as well as considering hardware specifications. However, various algorithms for supported autonomous driving that are not used for specific locations may be listed and may be used with location FOV data 118. The algorithms that are required or not required for any specific location may depend, in part, on the level of automation of the ADAS/AD vehicle 120. After any algorithms are deactivated based on the location FOV data 118 for a specified location, the corresponding memory and processing capacity may be utilized by one or more other algorithms.

As an example, consider a straight road with the ADAS/AD vehicles 120 traveling along the road at a substantial distance from the next intersection. Accordingly, algorithms for autonomous driving, such as the vehicle behavior prediction algorithm 1552 may continue to be used, while algorithms relevant to intersections might be deactivated, such as the pedestrian motion prediction algorithm 1556. When the vehicle reaches near the intersection, such as for making a right turn, the vehicle behavior prediction algorithm 1552 may be deactivated and the pedestrian motion prediction algorithm 1556 may be activated. This process ensures efficient utilization of memory and processing capacity.

Figure 16:
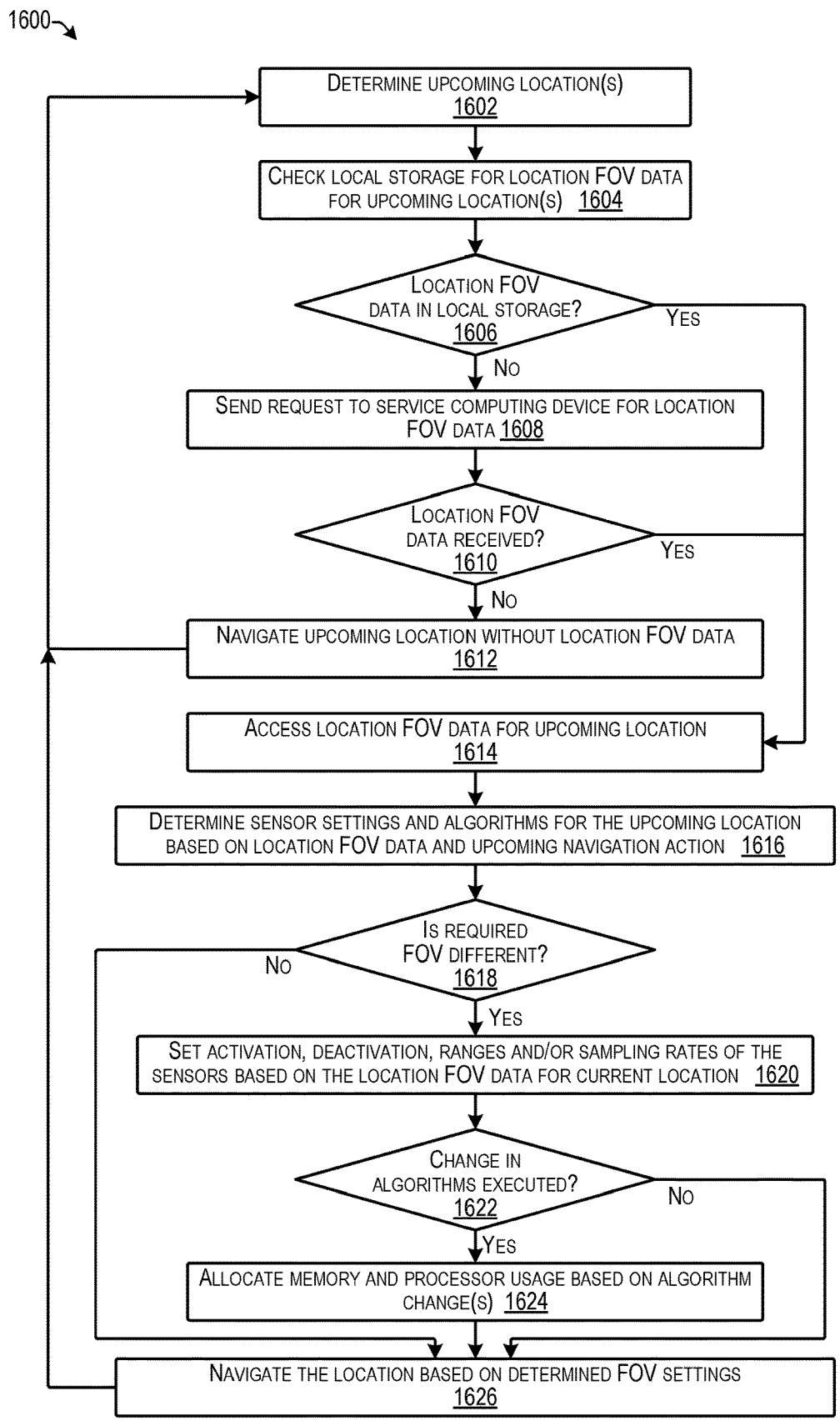
FIG. 16 is a flow diagram illustrating an example process for operating an ADAS/AD vehicle according to some implementations.

FIG. 16 is a flow diagram illustrating an example process 1600 for operating an ADAS/AD vehicle 120 according to some implementations. The process 1600 of FIG. 16 may be performed by a computing device executing processor-executable instructions, such as the vehicle computing device 122 of the ADAS/AD vehicle 120 executing the vehicle application 140.

At 1602, the computing device may determine upcoming locations to which the ADAS/AD vehicle 120 will be traveling. For example, the computing device may determine a route to a destination, and may check for location FOV data 118 for all locations along the route and any likely alternative routes. .

At 1604, the computing device may check the local storage for location FOV data 118 for the upcoming locations.

At 1606, the computing device may determine whether the location FOV data 118 for the upcoming locations is already present in the local storage. If so, the process goes to 1614. If not, the process goes to 1608.

At 1608, the computing device may send a request to the service computing device(s) 108 for the relevant location FOV data 118. For example, the computing device may send a request to the service computing device(s) 108 for location FOV data 118 for all roads and intersections included in the route to the destination. In some cases, the request may also include a request for location FOV data 118 for all roads and intersections in any alternative routes that might be taken instead.

At 1610, the computing device may determine whether the requested location FOV data 118 has been received. If so, the process goes to 1614. If not, the process goes to 1612.

At 1612, when the requested location FOV data 118 for one or more locations along the specified route is not received, the computing device may traverse these locations along the route without using the location FOV data 118. For instance, in some cases, the ADAS/AD vehicle 120 may traverse the particular location using all sensors and algorithms, such as at a slower speed than if the location FOV data 118 were available for the location, thereby providing the vehicle computing device 122 more time to process the sensor information.

At 1614, when the local storage has the location FOV data 118 for an upcoming location, the computing device may access the location FOV data 118 prior to arriving at the location.

At 1616, the computing device may determine the sensor settings and algorithms for the upcoming location based on the corresponding location FOV data 118 for that location and an upcoming navigation action (e.g., turn left, turn right, go straight).

At 1618, the computing device may determine whether the FOV for the upcoming location/navigation action is different from that already applied to the sensors and algorithms. If so, the process goes to 1620. If not, the process goes to 1626.

At 1620, if the FOV is different for the upcoming location/navigation action, the computing device may set activation, deactivation, ranges and/or sampling rates of the sensors the location. For instance, the computing device may select, based on the location FOV data 118, one or more sensors to activate on the ADAS/AD vehicle 120 for performing sensing in a direction of a field of view indicated by the location FOV data 118. In addition, the computing device may changing a sensing range of at least one sensor based on the location FOV data 118 for the upcoming location when traversing the upcoming location. Furthermore, the computing device may deactivate at least one sensor on ADAS/AD vehicle 120 that is configured to perform sensing in a direction outside the FOV indicated by the location FOV data 118. For instance, deactivating the sensor may include at least one of: turning off the at least one sensor; ignoring a signal from the at least one sensor; or reducing a sampling rate of the at least one sensor.

At 1622, the computing device may determine if there is a change in the algorithms to be executed based at least in part on the change to the activation, deactivation, ranges and/or sampling rates of the sensors. If so, the process goes to 1624. If not, the process goes to 1626.

At 1624, the computing device may allocate memory and processor usage based on the changes in the algorithms to the executed at the location.

At 1626, the computing device may navigate the location based on the determined FOV settings for the location. The process may return to 1602 for the next upcoming location.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, processes, and techniques described herein may be considered in the general context of computer-executable instructions, such as program modules stored on computer-readable media, and executed by the processor(s) herein. Generally, program modules include routines, programs, objects, components, data structures, executable code, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:

1. A system comprising:
   one or more processors; and
   one or more non-transitory computer-readable media storing executable instructions that configure the one or more processors to perform operations comprising:
   receiving, from a database, location field of view (FOV) data for an upcoming location on a route traversed by a vehicle, wherein the database includes location FOV data for a plurality of locations on the route, the location FOV data having been stored in the database in advance and having been determined from monitoring respective FOVs of a plurality of human operators of a plurality of vehicles that previously traversed the plurality of locations on the route;
   selecting, based at least on the location FOV data received from the database, a first set of one or more sensors to activate on the vehicle for performing sensing in a direction of a FOV indicated by the location FOV data for the upcoming location;
   selecting, based at least on the location FOV data received from the database, a second set of one or more other sensors to temporarily deactivate on the vehicle during traversal of the upcoming location, wherein the second set of one or more other sensors is configured to perform sensing outside of the FOV indicated by the location FOV data received from the database;
   based at least on the location FOV data received from the database, causing the vehicle to traverse the upcoming location with the first set of one or more selected sensors activated on the vehicle for performing sensing in the direction of the FOV indicated by the location FOV data; and
   based at least on the location FOV data received from the database, causing the vehicle to traverse at least a portion of the upcoming location with the second set of one or more other sensors temporarily deactivated on the vehicle.

2. The system as recited in claim 1, the operations further comprising:
   determining a destination for the vehicle;
   determining a path to the destination as the route;
   checking a version of the database that is maintained in a local storage on the vehicle for location FOV data for the plurality of locations on the route, including the upcoming location; and
   determining, prior to traversing the route, based at least on the location FOV data for the plurality of locations on the route, one or more of the sensors on the vehicle to activate at respective locations of the plurality of locations on the route, and one or more of the sensors on the vehicle to deactivate at the respective locations of the plurality of locations on the route.

3. The system as recited in claim 1, the operations further comprising, based on the location FOV data for one or more locations of the plurality of locations on the route not being included in a first version of the database that is maintained in a local storage on the vehicle, sending, over a network, to a computing device, a request for the location FOV data for the one or more locations, the computing device maintaining a second version of the database, including the location FOV data determined from monitoring the respective FOVs of the plurality of vehicle operators of the plurality of vehicles that previously traversed the plurality of locations on the route.

4. The system as recited in claim 1, wherein causing the vehicle to traverse at least the portion of the upcoming location with the second set of one or more other sensors temporarily deactivated comprises operating at least one sensor of the second set during traversal of at least a portion of the upcoming location with at least one of:
   a reduced sensing range that is greater than zero, a reduced sensor sampling rate that is greater than zero, or a reduced sensor FOV that is greater than zero.

5. The system as recited in claim 1, wherein causing the vehicle to traverse at least the portion of the upcoming location with the second set of one or more other sensors temporarily deactivated comprises at least one of:
   turning off at least one sensor of the second set; or
   ignoring a signal from at least one sensor of the second set.

6. The system as recited in claim 5, wherein ignoring the signal from at least one sensor of the second set comprises:
   determining one or more algorithms associated with the at least one sensor of the second set; and
   suspending execution of the one or more algorithms during deactivation of the at least one sensor of the second set.

7. The system as recited in claim 1, wherein the location FOV data included in the database indicates a field of view determined from monitoring the FOVs of a plurality of humans who previously operated a plurality of vehicles, respectively, at the upcoming location and a plurality of other locations on the route.

8. The system as recited in claim 1, the operations further comprising:
   determining that a first sensor of multiple sensors on the vehicle has failed;
   determining a sensor FOV of the first sensor;
   determining, based at least in part on the location FOV data in the database and the sensor FOV of the first sensor, a path to at least one of a repair location or other selected location, the path including a plurality of locations indicated by the FOV data to minimize use of the first sensor of the first set; and
   causing the vehicle to navigate the path.

9. A method comprising:
   receiving, by one or more processors on a vehicle, from a database, location field of view (FOV) data for an upcoming location on a route traversed by the vehicle, wherein the database includes location FOV data for a plurality of locations on the route, the location FOV data having been stored in the database in advance and having been determined from monitoring respective FOVs of a plurality of human operators of a plurality of vehicles that previously traversed the plurality of locations on the route;
   selecting, by the one or more processors, based at least on the location FOV data received from the database, a first set of one or more sensors to activate on the vehicle for performing sensing in a direction of a FOV indicated by the location FOV data for the upcoming location;
   selecting, by the one or more processors, based at least on the location FOV data received from the database, a second set of one or more other sensors to temporarily deactivate on the vehicle during traversal of the upcoming location;
   based at least on the location FOV data received from the database, causing, by the one or more processors, the vehicle to traverse the upcoming location with the first set of one or more sensors activated on the vehicle for performing sensing in the direction of the FOV indicated by the location FOV data; and
   based at least on the location FOV data received from the database, causing, by the one or more processors, the vehicle to traverse at least a portion of the upcoming location with the second set of one or more other sensors temporarily deactivated on the vehicle.

10. The method as recited in claim 9, further comprising determining a destination for the vehicle;
   determining a path to the destination as the route;
   checking a version of the database that is maintained in a local storage on the vehicle for location FOV data for the plurality of locations on the route, including the upcoming location; and
   determining, prior to traversing the route, based at least on the location FOV data for the plurality of locations on the route, one or more of the sensors on the vehicle to activate at respective locations of the plurality of locations on the route, and one or more of the sensors on the vehicle to deactivate at the respective locations of the plurality of locations on the route.

11. The method as recited in claim 9, further comprising, based on the location FOV data for one or more locations of the plurality of locations on the route not being included in a first version of the database that is maintained in a local storage on the vehicle, sending, over a network, to a computing device, a request for the location FOV data for the one or more locations, the computing device maintaining a second version of the database, including location FOV data determined from monitoring the respective FOVs of the plurality of vehicle operators of the plurality of vehicles that previously traversed the plurality of locations on the route.

12. The method as recited in claim 9, wherein causing the vehicle to traverse at least the portion of the upcoming location with the second set of one or more other sensors temporarily deactivated comprises operating at least one sensor of the second set during traversal of at least a portion of the upcoming location with at least one of:
   a reduced sensing range that is greater than zero, a reduced sensor sampling rate that is greater than zero, or a reduced sensor FOV that is greater than zero.

13. The method as recited in claim 9, wherein causing the vehicle to traverse at least the portion of the upcoming location with the second set of one or more other sensors temporarily deactivated comprises at least one of:
   turning off at least one sensor of the second set; or
   ignoring a signal from at least one sensor of the second set.

14. The method as recited in claim 13, wherein ignoring the signal from at least one sensor of the second set comprises:
   determining one or more algorithms associated with the at least one sensor of the second set; and
   suspending execution of the one or more algorithms during deactivation of the at least one sensor of the second set.

15. The method as recited in claim 9, wherein the location FOV data included in the database indicates a FOV determined from monitoring the FOVs of a plurality of humans who previously operated a plurality of vehicles, respectively, at the upcoming location and a plurality of other locations on the route.

16. A non-transitory computer-readable medium storing processor executable instructions which, when executed by one or more processors, configure the one or more processors to perform operations comprising:
   receiving, by one or more processors on a vehicle, from a database, location field of view (FOV) data for an upcoming location on a route traversed by the vehicle, wherein the database includes location FOV data for a plurality of locations on the route, the location FOV data having been stored in the database in advance and having been determined from monitoring respective FOVs of a plurality of human operators of a plurality of vehicles that previously traversed the plurality of locations on the route;
   selecting, by the one or more processors, based at least on the location FOV data received from the database, a first set of one or more sensors to activate on the vehicle for performing sensing in a direction of a FOV indicated by the location FOV data for the upcoming location;

selecting, by the one or more processors, based at least on the location FOV data received from the database, a second set of one or more other sensors to temporarily deactivate on the vehicle during traversal of the upcoming location;

based at least on the location FOV data received from the database, causing, by the one or more processors, the vehicle to traverse the upcoming location with the first set of one or more sensors activated on the vehicle for performing sensing in the direction of the FOV indicated by the location FOV data; and based at least on the location FOV data received from the database, causing, by the one or more processors, the vehicle to traverse at least a portion of the upcoming location with the second set of one or more other sensors temporarily deactivated on the vehicle.

17. The non-transitory computer-readable medium as recited in claim 16, the operations further comprising:

determining a destination for the vehicle;

determining a path to the destination as the route;

checking a version of the database that is maintained in a local storage on the vehicle for location FOV data for the plurality of locations on the route, including the upcoming location; and determining, prior to traversing the route, based at least on the location FOV data for the plurality of locations on the route, one or more of the sensors on the vehicle to activate at respective locations of the plurality of locations on the route, and one or more of the sensors on the vehicle to deactivate at the respective locations of the plurality of locations on the route.

18. The non-transitory computer-readable medium as recited in claim 16, wherein causing the vehicle to traverse at least the portion of the upcoming location with the second set of one or more other sensors temporarily deactivated comprises operating at least one sensor of the second set during traversal of at least a portion of the upcoming location with at least one of:

a reduced sensing range that is greater than zero, a reduced sensor sampling rate that is greater than zero, or a reduced sensor FOV that is greater than zero.

19. The non-transitory computer-readable medium as recited in claim 16, wherein the operation of causing the vehicle to traverse at least the portion of the upcoming location with the second set of one or more other sensors temporarily deactivated comprises at least one of:

turning off at least one sensor of the second set; or ignoring a signal from at least one sensor of the second set.

20. The non-transitory computer-readable medium as recited in claim 19, wherein ignoring the signal from at least one sensor of the second set comprises:

determining one or more algorithms associated with the at least one sensor of the second set; and suspending execution of the one or more algorithms during deactivation of the at least one senor of the second set.

21. The non-transitory computer-readable medium as recited in claim 16, wherein the location FOV data included in the database includes aggregated FOV data determined from monitoring the plurality of human operators who previously operated respective vehicles of the plurality of vehicles at the upcoming location.

* * * * *